US012463442B2

(12) United States Patent
Song et al.

(10) Patent No.: US 12,463,442 B2
(45) Date of Patent: Nov. 4, 2025

(54) ELECTRONIC DEVICE TRANSMITTING WIRELESS POWER AND METHOD FOR DISPLAYING CHARGING INFORMATION FOR ELECTRONIC DEVICE

(71) Applicant: SAMSUNG ELECTRONICS CO., LTD., Suwon-si (KR)

(72) Inventors: Jeonghan Song, Suwon-si (KR); Eunha Choi, Suwon-si (KR); Jaeseok Park, Suwon-si (KR); Jaehyun Park, Suwon-si (KR); Jiwon Park, Suwon-si (KR); Seungjae Lee, Suwon-si (KR); Soonkyu Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 480 days.

(21) Appl. No.: 17/516,989

(22) Filed: Nov. 2, 2021

(65) Prior Publication Data

US 2022/0140630 A1    May 5, 2022

Related U.S. Application Data

(63) Continuation of application No. PCT/KR2021/015062, filed on Oct. 26, 2021.

(30) Foreign Application Priority Data

Nov. 3, 2020    (KR) .......................... 10-2020-0145412

(51) Int. Cl.
*H02J 7/00* (2006.01)
*G06F 3/01* (2006.01)
(Continued)

(52) U.S. Cl.
CPC ............ *H02J 7/0047* (2013.01); *G06F 3/017* (2013.01); *G09G 3/002* (2013.01); *H02J 7/0013* (2013.01);
(Continued)

(58) Field of Classification Search
CPC ....................................................... H02J 50/30
See application file for complete search history.

(56) References Cited

U.S. PATENT DOCUMENTS 9,387,771 B1 *  7/2016  Shekher ................. B60L 53/62
2012/0161696 A1   6/2012  Cook et al.
(Continued)

FOREIGN PATENT DOCUMENTS

KR    10-2013-0121850    11/2013
KR    10-2013-0124698    11/2013
(Continued)

OTHER PUBLICATIONS

Jung, KR20130124698_translation, Apparatus for transmitting wireless power (Year: 2013).*
(Continued)

*Primary Examiner* — Tynese V McDaniel
(74) *Attorney, Agent, or Firm* — NIXON & VANDERHYE P.C.

(57) ABSTRACT

According to the disclosure, an electronic device and a method for displaying charging information for the electronic device are provided. According to the disclosure, an electronic device comprises: a first resonator including at least one coil, a second resonator including at least one coil, at least one light emitting device including light emitting circuitry, at least one phase shifter including phase shifting circuitry, and a processor. The processor may be configured to: control the electronic device to receive a signal for changing a wirelessly chargeable area, control the at least one light emitting device to display a second wirelessly chargeable area changed from a first wirelessly chargeable area of the electronic device on a plane where the electronic device is placed in response to receiving the signal for changing the wirelessly chargeable area, and control the at least one phase shifter to supply phase-shifted power to the (Continued)

first resonator or the second resonator to output wireless power in a direction corresponding to the second wirelessly chargeable area.

17 Claims, 37 Drawing Sheets

(51) Int. Cl.
  *G09G 3/00* (2006.01)
  *H02J 50/00* (2016.01)
  *H02J 50/12* (2016.01)
  *H02J 50/40* (2016.01)
  *H02J 50/80* (2016.01)

(52) U.S. Cl.
  CPC ............ *H02J 50/005* (2020.01); *H02J 50/12* (2016.02); *H02J 50/40* (2016.02); *H02J 50/80* (2016.02); *G09G 2354/00* (2013.01)

(56) References Cited

U.S. PATENT DOCUMENTS

| | | | |
|---|---|---|---|
| 2013/0069587 A1 | 3/2013 | Kuk | |
| 2013/0300356 A1* | 11/2013 | Yang | H02J 50/12 320/108 |
| 2014/0184155 A1 | 7/2014 | Cha | |
| 2015/0054458 A1 | 2/2015 | Yoon et al. | |
| 2017/0353060 A1* | 12/2017 | Xiong | H02J 50/70 |
| 2018/0342896 A1* | 11/2018 | Zhang | H02J 50/23 |
| 2019/0032876 A1 | 1/2019 | Jan | |
| 2020/0336185 A1* | 10/2020 | Lee | H02J 50/90 |
| 2021/0391756 A1* | 12/2021 | Azam | H02J 50/90 |
| 2022/0063438 A1* | 3/2022 | Choi | H02J 7/0048 |
| 2022/0140630 A1* | 5/2022 | Song | G09G 3/002 320/108 |
| 2023/0143950 A1* | 5/2023 | Choi | H02J 50/12 320/108 |
| 2023/0208201 A1* | 6/2023 | Dahl | H02J 7/35 320/101 |
| 2023/0333202 A1* | 10/2023 | Gu | G01S 13/02 |

FOREIGN PATENT DOCUMENTS

| | | | | |
|---|---|---|---|---|
| KR | 10-2013-0127095 | | 11/2013 | |
| KR | 20130124698 | * | 11/2013 | |
| KR | 10-2015-0021803 | | 3/2015 | |
| KR | 10-2015-0097887 | | 8/2015 | |
| KR | 10-2016-0034098 | | 3/2016 | |
| KR | 10-2017-0089528 | | 8/2017 | |
| KR | 10-2017-0112900 | | 10/2017 | |
| KR | 10-2020-0038577 | | 4/2020 | |
| KR | 10-2020-0072455 A | | 6/2020 | |
| KR | 10-2020-0082961 | | 7/2020 | |
| KR | 10-2020-0122626 | | 10/2020 | |
| KR | 20240013596 A | * | 1/2024 | ............ H02J 50/12 |
| WO | 2019/224827 | | 11/2019 | |
| WO | 2020/180631 | | 9/2020 | |
| WO | WO-2023277308 A1 | * | 1/2023 | ............ H02J 50/005 |

OTHER PUBLICATIONS

WO-2023277308 translation, Jang, Wireless Power Reception Apparatus, Wireless Power Transmission Apparatus, and Operating Method Therefor (Year: 2023).*

KR-20240013596 translation, Gu Magnetic Substance Displacement Control Module And Electronic Device Including Thereof (Year: 2024).*

International Search Report and Written Opinion dated Feb. 9, 2022 in corresponding International Application No. PCT/KR2021/015062.

Korean Examination Report dated Mar. 11, 2025 for KR Application No. 10-2020-0145412.

* cited by examiner

ELECTRONIC DEVICE TRANSMITTING WIRELESS POWER AND METHOD FOR DISPLAYING CHARGING INFORMATION FOR ELECTRONIC DEVICE

CROSS-REFERENCE TO RELATED APPLICATIONS

This application is a continuation of International Application No. PCT/KR2021/015062 designating the United States and filed on Oct. 26, 2021, in the Korean Intellectual Property Receiving Office and claiming priority to Korean Patent Application No. 10-2020-0145412, filed on Nov. 3, 2020, in the Korean Intellectual Property Office, the disclosures of which are incorporated by reference herein in their entireties.

BACKGROUND

Field

The disclosure relates to an electronic device that transmits wireless power for wireless charging and a method for displaying charging information by the electronic device.

Description of Related Art

Wireless charging technology adopts wireless power transmission/reception. For example, wireless charging may automatically charge the battery of a mobile phone by simply placing the mobile phone on a wireless power transmitter (e.g., a charging pad) without connection via a separate charging connector. Wireless communication technology eliminates the need for a connector for supplying power to electronics, thus providing enhanced waterproofing, and also requires no wired charger to thus provide better portability.

As wireless communication technology evolves, there is an ongoing research effort to charge various electronic devices (wireless power receivers) by supplying power from a single electronic device (wireless power transmitter) to them. Wireless charging comes in a few different types, such as of electromagnetic induction using a coil, resonance, and radio frequency (RF)/microwave radiation that converts electrical energy into microwaves and transfers the microwaves.

Electromagnetic induction or resonance types of wireless communication are recently in wide use for smartphones or such electronic devices. If a power transmitting unit (PTU) (e.g., a wireless power transmitter) and a power receiving unit (PRU) (e.g., a smartphone or a wearable electronic device) come in contact or close to each other within a predetermined distance, the battery of the power receiving unit may be charged by electromagnetic induction or electromagnetic resonance between the transmission coil of the power transmitting unit and the reception coil of the power receiving unit.

At least one wireless power transmitter may simultaneously charge a plurality of wireless power receivers (e.g., electronic devices). For example, the wireless power transmitter may charge at least one electronic device within a predetermined distance according to the wireless charging scheme.

The wireless power transmitter is able to transmit wireless power by electromagnetic induction or resonance although being a predetermined distance away from the target electronic device. Thus, it is difficult for the user to spatially recognize whether the target electronic device is within the chargeable area.

SUMMARY

Embodiments of the disclosure provide a wireless power transmitting electronic device capable of displaying information for the chargeable area from a wireless power transmitter on the plane where the wireless power transmitter is placed and a method for displaying charging information for the electronic device.

Embodiments of the disclosure provide a wireless power transmitting electronic device capable of changing the chargeable area by a wireless power transmitter according to settings and displaying information for the changed chargeable area on the plane where the wireless power transmitter is placed and a method for displaying charging information for the electronic device.

According to an example embodiment, an electronic device may comprise: a first resonator including at least one coil, a second resonator including at least one coil, at least one light emitting device including light emitting circuitry, at least one phase shifter including phase shifting circuitry, and a processor. The processor may be configured to: control the electronic device to receive a signal for changing a wirelessly chargeable area, control the at least one light emitting device to display a second wirelessly chargeable area changed from a first wirelessly chargeable area of the electronic device on a plane where the electronic device is placed in response to receiving the signal for changing the wirelessly chargeable area, and control the at least one phase shifter to supply phase-shifted power to the first resonator or the second resonator to output wireless power in a direction corresponding to the second wirelessly chargeable area.

According to an example embodiment, a method for displaying charging information for an electronic device may comprise: receiving a signal for changing a wirelessly chargeable area, controlling at least one light emitting device to display a second wirelessly chargeable area changed from a first wirelessly chargeable area of the electronic device on a plane where the electronic device is placed in response to receiving the signal for changing the wirelessly chargeable area, and controlling the electronic device to supply phase-shifted power to a first resonator or a second resonator included in the electronic device to output wireless power in a direction corresponding to the second wirelessly chargeable area.

According to various example embodiments, as information for the chargeable area from the wireless power transmitter is displayed on the plane where the wireless power transmitter is placed, the user may easily recognize the chargeable area visually.

According to various example embodiments, the chargeable area from the wireless power transmitter may be changed according to settings, and information for the changed chargeable area may be displayed on the plane where the wireless power transmitter is placed. Thus, the user may easily identify the chargeable area visually.

According to various example embodiments, when the wireless power transmitter charges a plurality of electronic devices, charging-related information for each electronic device may be displayed on the plane where the wireless power transmitter is placed. Thus, the user may easily identify the charging-related information visually.

According to various example embodiments, when the wireless power transmitter charges a plurality of electronic devices, charging-related information for each electronic device may be displayed on the plane where the wireless power transmitter is placed, and charging priority may be set by the user's gesture. Thus, it is possible to easily control charging of the plurality of electronic devices.

According to various example embodiments, when a plurality of wireless power transmitters are placed on a plane, information for an entire area chargeable from the plurality of wireless power transmitters may be displayed on the plane where the wireless power transmitters are placed. Thus, the user may easily identify the chargeable area visually.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
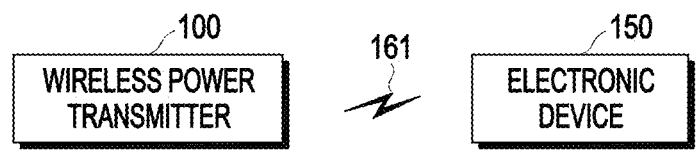
FIG. 1A is a block diagram illustrating an example wireless power transmitter and an electronic device according to various embodiments.

FIG. 1A is a block diagram illustrating an example wireless power transmitter and an electronic device according to various embodiments.

Referring to FIG. 1A, according to various embodiments, a wireless power transmitter 100 (e.g., an electronic device) may wirelessly transmit power 161 to a wireless power receiver 150 (hereinafter, referred to as an 'electronic device 150' or an 'external electronic device'). The wireless power transmitter 100 may transmit the power 161 to the electronic device 150 according to various charging schemes. For example, the wireless power transmitter 100 may transmit the power 161 according to an induction scheme. Adopting the induction scheme, the wireless power transmitter 100 may include, e.g., a power source, a direct current (DC)-alternating current (AC) converting circuit, an amplifying circuit, an impedance matching circuit, at least one capacitor, at least one coil, and a communication modulation/demodulation circuit. The at least one capacitor together with the at least one coil may include a resonance circuit. The wireless power transmitter 100 may be operated in a scheme that may, for example, be defined in the wireless power consortium (WPC) standards (or Qi standards).

For example, the wireless power transmitter 100 may transmit the power 161 according to a resonance scheme. Adopting the resonance scheme, the wireless power transmitter 100 may include, e.g., a power source, a DC-AC converting circuit, an amplifying circuit, an impedance matching circuit, at least one capacitor, at least one coil, and an out-band communication circuit (e.g., a Bluetooth low energy (BLE) communication circuit). The at least one capacitor and the at least one coil may include a resonance circuit. The wireless power transmitter 100 may be operated in a scheme that may, for example, be defined in the alliance for wireless power (A4WP) standards (or air fuel alliance (AFA) standards). The wireless power transmitter 100 may include a coil that is capable of produce an induced magnetic field when letting an electric current flow by a resonance or induction scheme. The process of the wireless power transmitter 100 producing an induced magnetic field may be represented as the wireless power transmitter 100 wirelessly transmitting the power 161. Further, the electronic device 150 may include a coil that produces an induced electromotive force by the magnetic field generated around and varying in magnitude over time. The process of the electronic device 150 producing an induced electromotive force through the coil may be represented as the electronic device 150 wirelessly receiving the power 161.

According to various embodiments of the disclosure, the wireless power transmitter 100 may communicate with the electronic device 150. For example, the wireless power transmitter 100 may communicate with the electronic device 150 according to an in-band scheme. The wireless power transmitter 100 or the electronic device 150 may vary the load (or impedance) corresponding to the data to be transmitted, according to, e.g., an on/off keying modulation scheme. The wireless power transmitter 100 or the electronic device 150 may determine the data transmitted from the counterpart device by measuring a variation in load (or variation in impedance) based on a variation in the current, voltage, or power across the coil.

For example, the wireless power transmitter 100 may communicate with the electronic device 150 according to an out-band (or out-of-band) scheme. The wireless power transmitter 100 or the electronic device 150 may communicate data using a short-range communication module (e.g., a BLE communication module) provided separately from the coil or patch antennas.

As set forth herein, the "wireless power transmitter 100 or the electronic device 150" performs a particular operation may refer, for example, to various hardware devices, e.g., a processor, a coil, or a patch antenna, included in the wireless power transmitter 100 or the electronic device 150 performing the particular operation. The "wireless power transmitter 100 or the electronic device 150 performs a particular operation" may also refer, for example, to the processor controlling another hardware device to perform the particular operation. For example, as described below, the processor included in the wireless power transmitter 100 may control the electronic device 150 to perform a specific operation (e.g., controls the light emitting device 242 or 900 included in the wireless power transmitter 100 to display a wirelessly chargeable area on a plane). The 'wireless power transmitter 100 or the electronic device 150 performs a particular operation' may also refer, for example, to the processor or another hardware device triggering the particular operation as an instruction for performing the particular operation, which is stored in a storage circuit (e.g., a memory) of the wireless power transmitter 100 or the electronic device 150, is executed.

Figure 1B:
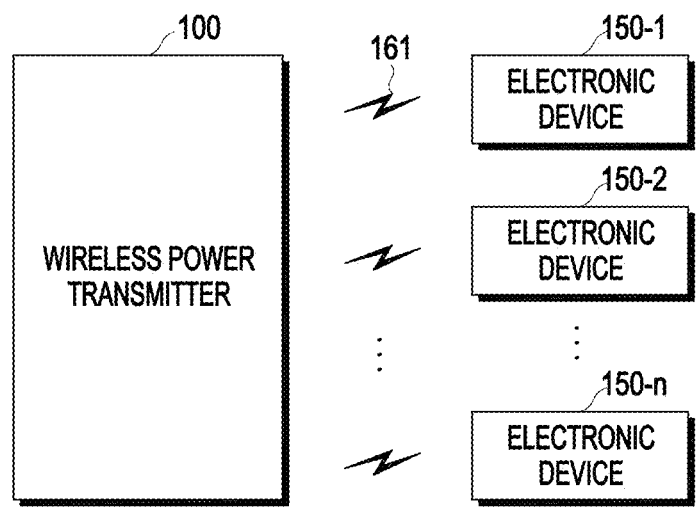
FIG. 1B is a block diagram illustrating an example wireless power transmitter and a plurality of electronic devices according to various embodiments.

FIG. 1B is a block diagram illustrating an example wireless power transmitter and a plurality of electronic devices according to various embodiments.

As illustrated in FIG. 1B, a wireless power transmitter 100 may wirelessly form electrical connections with a plurality of electronic devices 150-1, 150-2, . . . , and 150-n. The plurality of electronic devices may include at least one of, e.g., a smartphone, a watch, a wireless earphone, an augmented reality/virtual reality (AR/VR) device, a touchpad, a laptop computer, a touchpad, a personal digital assistant (PDA), a personal multimedia player (PMP), or the like, but is not limited thereto.

The wireless power transmitter 100 may wirelessly transmit power 161 to the plurality of electronic devices 150-1, 150-2, . . . , and 150-n. For example, the wireless power transmitter 100 may transmit power to the plurality of electronic devices 150-1, 150-2, . . . , and 150-n through a resonance scheme. When the wireless power transmitter 100 adopts a resonance scheme, the power-transmittable/receivable distance between the wireless power transmitter 100 and the plurality of electronic devices 150-1, 150-2, . . . , and 150-$n$ may, for example, be 50 cm or less, or 30 cm or less. For example, the wireless power transmitter 100 may transmit power to the plurality of electronic devices 150-1, 150-2, . . . , and 150-$n$ through an induction scheme. When the wireless power transmitter 100 adopts the induction scheme, the power-transmittable/receivable distance between the wireless power transmitter 100 and the plurality of electronic devices 150-1, 150-2, . . . , and 150-$n$ may be, e.g., 10 cm or less. According to an embodiment, at least one of the plurality of electronic devices 150-1, 150-2, . . . , and 150-$n$ may receive power from the wireless power transmitter 100 by a resonance scheme, and at least one other electronic device 150 among the plurality of electronic devices 150-1, 150-2, . . . , and 150-$n$ may receive power from the wireless power transmitter 100 by an induction scheme.

The processor included in the wireless power transmitter 100 may control the wireless power transmitter 100 to wirelessly transmit preset power 161 to the plurality of electronic devices 150-1, 150-2, . . . , and 150-$n$. For example, the power preset for the plurality of electronic devices 150-1, 150-2, . . . , and 150-$n$ may be a level of power set to activate (e.g., wake-up) the processors included in the plurality of electronic devices 150-1, 150-2, . . . , and 150-$n$. The preset power 161 may be set considering various types of information for the plurality of electronic devices 150-1, 150-2, . . . , and 150-$n$ (e.g., various types of electronic devices 150-1, 150-2, . . . , and 150-$n$, information for various power required for the plurality of electronic devices 150-1, 150-2, . . . , and 150-$n$, voltage or current information related to various power of the plurality of electronic devices 150-1, 150-2, . . . , and 150-$n$, information for various ratings (e.g., effective values) of the plurality of electronic devices 150-1, 150-2, . . . , and 150-$n$, and information for the orientations (e.g., posture information) of the plurality of electronic devices 150-1, 150-2, . . . , and 150-$n$).

The wireless power transmitter 100 may perform communication with the plurality of electronic devices 150-1, 150-2, . . . , and 150-$n$, individually, simultaneously or at different times, selectively or independently. Each of the plurality of electronic devices 150-1, 150-2, . . . , and 150-$n$ may transmit and receive data to/from the wireless power transmitter 100 according to either an in-band scheme or out-band scheme.

The data may include data for controlling power reception of each of the plurality of electronic devices. Further, the data may include various types of information for the plurality of electronic devices 150-1, 150-2, . . . , and 150-$n$ (e.g., various types of electronic devices 150-1, 150-2, . . . , and 150-$n$, information for various power required for the plurality of electronic devices 150-1, 150-2, . . . , and 150-$n$, voltage or current information related to various power of the plurality of electronic devices 150-1, 150-2, . . . , and 150-$n$, information for various ratings (e.g., effective values) of the plurality of electronic devices 150-1, 150-2, . . . , and 150-$n$, and information for the orientations (e.g., posture information) of the plurality of electronic devices 150-1, 150-2, . . . , and 150-$n$). Although FIG. 1B illustrates that one wireless power transmitter 100 transmits wireless charging power to a plurality of electronic devices 150-1, 150-2, . . . , and 150-$n$, a plurality of wireless power transmitters 200-1, 200-2, and 200-3 may transmit wireless charging power to a plurality of electronic devices 150-1, 150-2, . . . , and 150-$n$ as described below in connection with FIGS. 16 and 17.

Figure 2A:
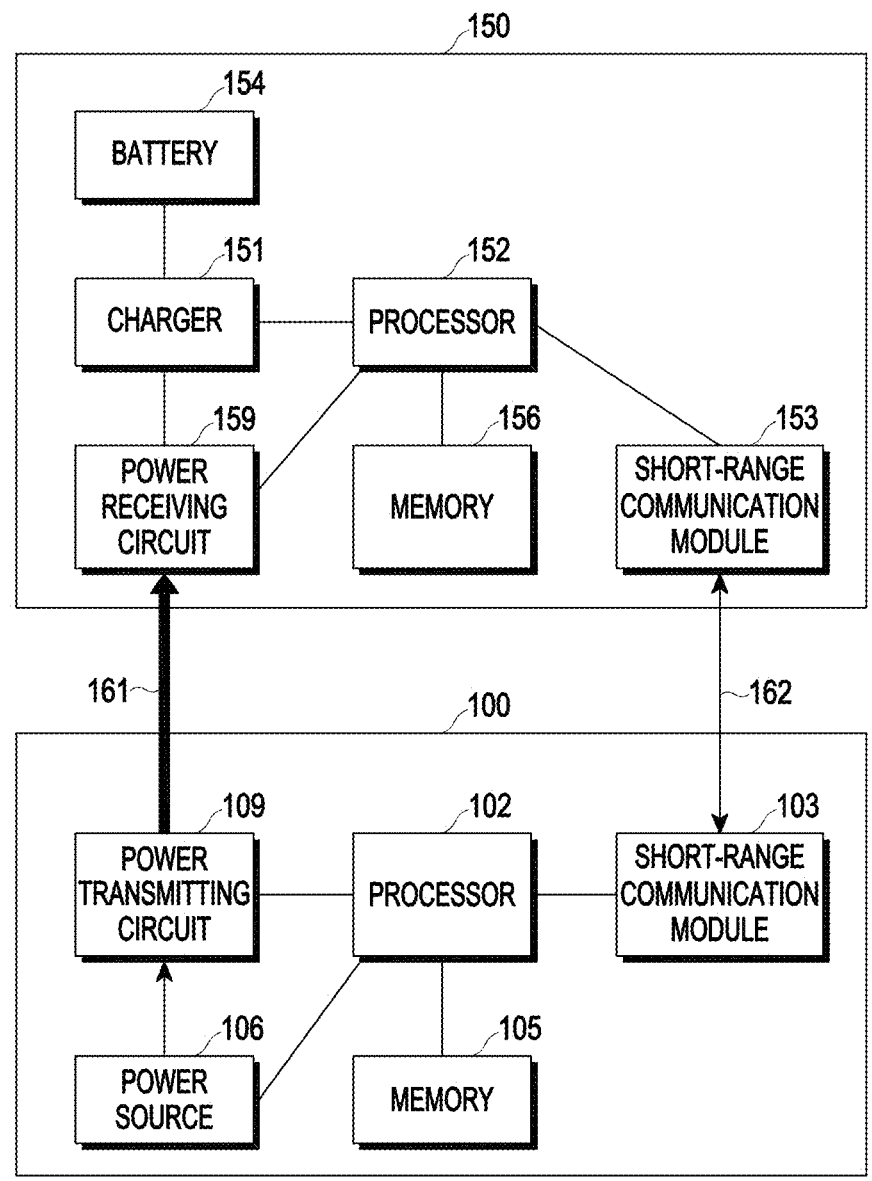
FIG. 2A is a diagram illustrating a wireless power transmitter and an electronic device according to various embodiments.

FIG. 2A is a block diagram illustrating a wireless power transmitter and an electronic device according to various embodiments.

Referring to FIG. 2A, according to various embodiments, a wireless power transmitter 100 may include at least one of a processor (e.g., including processing circuitry) 102, a short-range communication module (e.g., including communication circuitry) 103, a memory 105, a power source 106, and/or a power transmitting circuit 109. According to various embodiments, an electronic device 150 may include at least one of a charger, a processor (e.g., including processing circuitry) 152, a short-range communication module (e.g., including communication circuitry) 153, a battery 154, a memory 156, or a power receiving circuit 159.

According to various embodiments, the power transmitting circuit 109 may wirelessly transmit power 161 as per at least one of, for example, and without limitation, an induction scheme, a resonance scheme, or an electromagnetic wave scheme. The detailed configurations of the power transmitting circuit 109 and the power receiving circuit 159 are described below in greater detail with reference to FIGS. 2A and 2B.

The processor 102 may include various processing circuitry and control the overall operation of the wireless power transmitter 100. For example, the processor 102 may determine whether to transmit the power 161, control the magnitude of the power 161, or control at least one function (e.g., starts or stops charging) of the electronic device 150. The processor 102 or the processor 152 may be implemented in various circuits capable of performing calculation, such as, for example, and without limitation, a central processing unit (CPU), a dedicated processor or other general-purpose processors, a mini-computer, a microprocessor, a micro controlling unit (MCU), a field programmable gate array (FPGA), or the like, but not limited in type thereto. The processor 102 may transmit/receive data to/from the electronic device 150 via the short-range communication module 103. The data may be used for control of wireless power transmission/reception.

The short-range communication module 103 and the short-range communication module 153 may include various communication circuitry implemented as, e.g., out-band short-range communication modules (e.g., Bluetooth communication modules (BT or BLE) or near-field communication (NFC) communication modules) or in-band short-range communication modules. In the in-band communication scheme, the short-range communication module 153 may include a switch connected with, e.g., a coil of the power receiving circuit 159 directly or via another element and a dummy load (e.g., a dummy resistor or dummy capacitor) connected through the switch to the coil directly or via another element. The short-range communication module 103 may identify information based on a variation in the voltage or current applied to the coil in the power transmitting circuit 109.

According to various embodiments, the power receiving circuit 159 may wirelessly receive power as per at least one of, for example, and without limitation, an induction scheme, a resonance scheme, or an electromagnetic wave scheme, or the like, from the power transmitting circuit 109. The power receiving circuit 159 may performing power processing, such as rectifying the received alternating current (AC) power into a direct current (DC) waveform, converting the voltage, or regulating the power. The charger 151 may charge the battery 154 with the regulated power (e.g., DC power) received. The charger 151 may adjust at least one of the voltage or current of the received power and transfer the adjusted power to the battery 154. The battery 154 may store power and transfer the power to other hardware components. Although not shown, a power management integrated circuit (PMIC) (not shown) may receive power from the power receiving circuit 159 and transfer the power to other hardware components, or the PMIC may receive power from the battery 154 and transfer the power to other hardware components.

The processor 152 may include various processing circuitry and control the overall operation of the electronic device 150. The memory 156 may store instructions to perform the overall operation of the electronic device 150. The memory 105 may store instructions for performing the overall operation of the wireless power transmitter 100.

The memory 105 may store a lookup table for the relationship between information obtained via the short-range communication module 103 and the magnitude of power to be transmitted or equation information for the relationship between obtained information and the magnitude of power to be transmitted. The memory 105 or the memory 156 may be implemented in various types, such as, for example, a read only memory (ROM), a random access memory (RAM), or a flash memory, but not limited in type thereto.

Figure 2B:
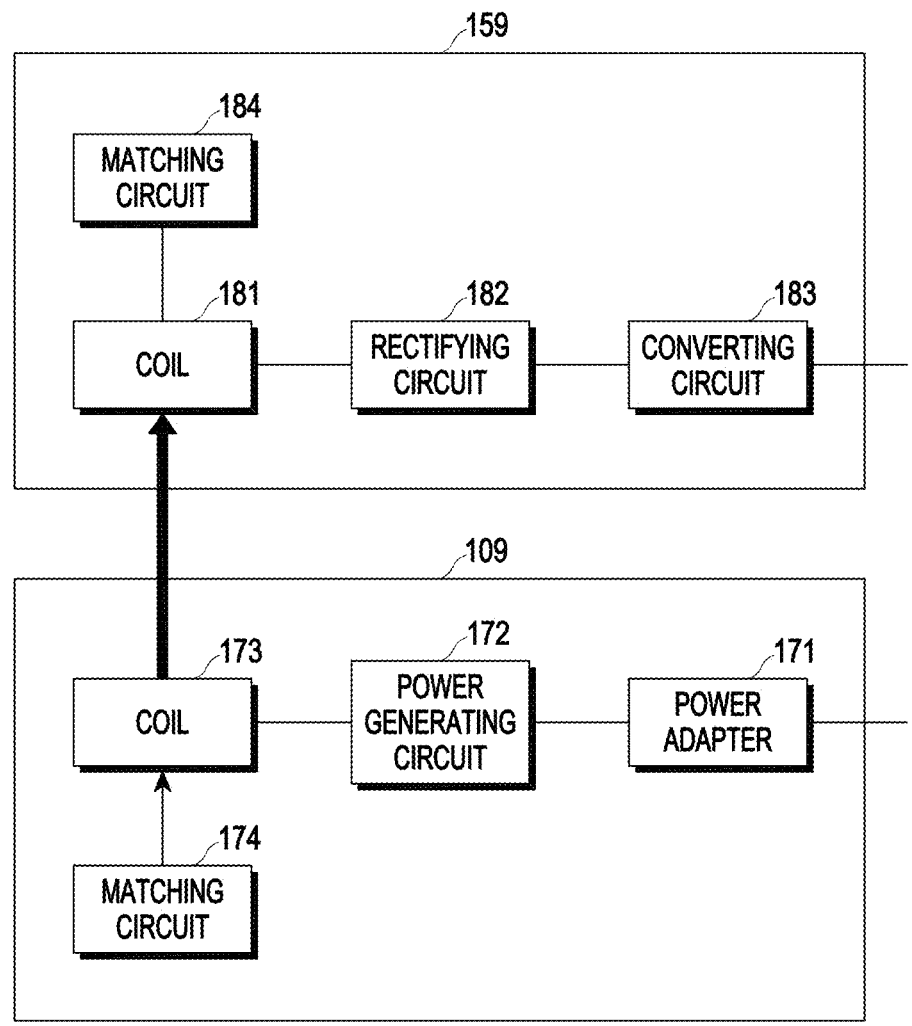
FIG. 2B is a block diagram illustrating a power transmitting circuit and a power receiving circuit according to various embodiments.

FIG. 2B is a block diagram illustrating an example power transmitting circuit and a power receiving circuit according to various embodiments.

According to various embodiments, the power transmitting circuit 109 may include a power adapter 171, a power generating circuit 172, a coil 173, and a matching circuit 174. The power adapter 171 may receive power from the power source 106 and provide the power to the power generating circuit 172. The power adapter 171 may include, e.g., a power interface and, according to various embodiments, the power adapter 171 may not be included in the wireless power transmitter 100. The power generating circuit 172 may convert the received power into, e.g., an AC waveform and/or may amplify the received power and transfer the amplified power to the coil 173. The frequency of the AC waveform may be set to be a value from 100 kHz to 205 kHz or 6.78 MHz depending on a standard, but not limited thereto. The power generating circuit 172 may include an inverter. For example, the inverter may be a full-bridge inverter or a half-bridge inverter but is not limited thereto. When power is applied to the coil 173, an induced magnetic field that varies in magnitude over time may be produced across the coil 173, thus allowing for wireless transmission of power. Although not shown, at least one capacitor that, along with the coil 173, includes a resonance circuit may further be included in the power transmitting circuit 109. The matching circuit 174 may impedance-match the power transmitting circuit 109 with the power receiving circuit 159 by varying at least one of the capacitance or reactance of the circuit connected with the coil 173 under the control of the processor 102. An induced electromotive force may be generated at the coil 181 of the power receiving circuit 159 by the magnetic field which varies in magnitude over time, and accordingly, the power receiving circuit 159 may wirelessly receive power. The rectifying circuit 182 may rectify the AC waveform of power received. A converting circuit 183 may adjust the voltage of the power rectified and transfer the result to the PMIC or charger. The power receiving circuit 159 may further include a regulator. The converting circuit 183 may be replaced with a regulator. The matching circuit 184 may impedance-match the power transmitting circuit 109 with the power receiving circuit 159 by varying at least one of the capacitance or reactance of the circuit connected with the coil 181 under the control of the processor 152. According to various embodiments, there may be provided one or more coils 173. When there are a plurality of coils 173, the coils may be connected to each other in series or in parallel.

Figure 3:
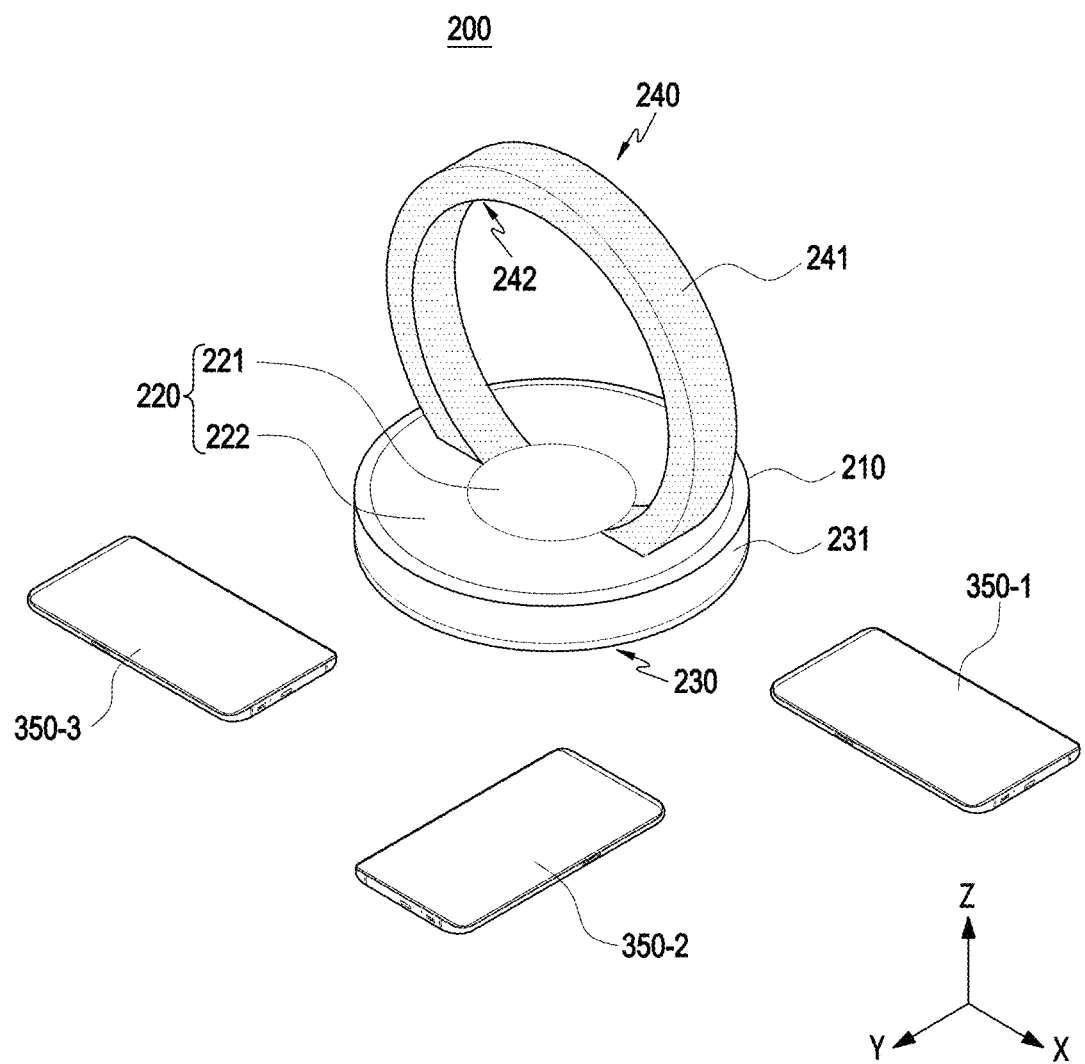
FIG. 3 is a diagram illustrating a wireless power transmitter and at least one electronic device according to various embodiments.

FIG. 3 is a diagram illustrating an example wireless power transmitter and at least one electronic device according to various embodiments.

Referring to FIG. 3, a wireless power transmitter 200 (e.g., the wireless power transmitter 100 of FIGS. 1A to 2B) may include a housing 210, a display unit (e.g., including a display) 220 disposed on one surface of the housing 210, and at least one resonator 230 and 240. A plurality of electronic devices 350-1, 350-2, and 350-3 may be disposed within a predetermined (e.g., specified) distance from the wireless power transmitter 200.

According to various embodiments, the coordinate axes shown in the drawings of the disclosure may be used to denote the directions in which some components are oriented. For example, the coordinate axes may be the coordinate axes X, Y, and Z in a three-dimensional (3D) space. Referring to FIG. 3, the X axis may be an axis parallel to the horizontal direction (or length direction) of the wireless power transmitter 200, and the Y axis may be an axis parallel to the vertical direction (or width direction) of the wireless power transmitter 200. The Z axis may be an axis parallel to the height direction of the wireless power transmitter 200. The wireless power transmitter 200 and the electronic devices 350-1, 350-2, and 350-3 may be placed on three-dimensional spatial coordinates. Further, when the wireless power transmitter 200 is viewed from above, the wireless power transmitter 200 and the electronic devices 350-1, 350-2, and 350-3 are placed on a virtual plane including the X-axis and the Y-axis. The coupling relationship between the components may be described with reference to various drawings of the disclosure and the coordinate axes therein.

The housing 210 may include a part that forms the exterior of the wireless power transmitter 200 and may include a space for receiving various electronic components (e.g., the processor 102, the short-range communication module 103, the memory 105, the power source 106, and the power transmitting circuit 109) included in the wireless power transmitter 200. The shape of the housing 210 of the wireless power transmitter 200 according to various embodiments of the disclosure is not limited to any specific example. For example, in the embodiment illustrated in FIG. 3, the housing 210 may have a cylindrical shape, but is not limited thereto. Various other embodiments may be applied, such as, for example, and without limitation, a polyhedron including a hexahedron, etc.

According to various embodiments, the display unit 220 includes a display and may be a device for visually providing information to the user. According to an embodiment, the display unit 220 may be disposed on one surface of the housing 210. According to an embodiment, the display unit 220 may include a display panel, and may be formed to provide a wide screen to the user by occupying most of the upper surface of the housing 210. According to an embodiment, the display unit 220 may be divided into a first area 221 located in the center of the display unit 220 and a second area 222 surrounding the first area 221. The display unit 220 may provide the user with information for the wireless power transmitter 200 and/or the electronic devices 350-1, 350-2, and 350-3, and/or other information, such as time, temperature, and humidity, using at least one of the first area 221 and the second area 222. For example, the display unit 220 may provide information for the wireless power transmitter 200 and information for at least one of time, temperature, or humidity, through the first area 221 and provide information for the electronic devices 350-1, 350-2, and 350-3 through the second area 222. According to various embodiments, the display unit 220 may further include touch circuitry or a pressure sensor capable of measuring the strength of a pressure for a touch.

The wireless power transmitter 200 may include resonators 230 and 240. The power transmitting circuit 109 described above with reference to FIG. 2A may be implemented as the resonators 230 and 240 including at least one coil and at least one capacitor.

The resonators 230 and 240 may include a first resonator 230 including at least one coil and at least one capacitor and surrounded by a first resonator housing 231 and a second resonator 240 including at least one coil and at least one capacitor and surrounded by a second resonator housing 241.

The housing 210 may form a mechanical structure capable of mounting the first resonator housing 231 and the second resonator housing 241. The first resonator housing 231 may be disposed to lie on the housing 210 in a horizontal direction, and the second resonator housing 241 may be disposed to lie on the housing 210 in a vertical direction. With this structure, the first resonator 230 may be coupled to transmit wireless power to the electronic devices placed on the floor near the wireless power transmitter 200. The second resonator 240 may be coupled to transmit wireless power to electronic devices which are erected near the wireless power transmitter 200 or spaced apart from the floor by a predetermined in the height direction of the wireless power transmitter 200.

According to various embodiments, at least one light emitting device 242 may be disposed inside an upper portion of the second resonator housing 241. According to various embodiments, the at least one light emitting device 242 may include various light emitting circuitry, such as, for example, and without limitation, at least one of a laser diode (LD), a light emitting diode (LED), a beam projector, or the like. The light emitting device 242 may display a wirelessly chargeable area on a plane by irradiating light onto the plane (e.g., an XY plane) where the wireless power transmitter 200 is placed. According to various embodiments, the light emitting device 242 may display information related to wireless charging on the plane by irradiating light onto the plane (e.g., the XY plane) where the wireless power transmitter 200 is placed. According to various embodiments, the wirelessly chargeable area displayed by the light emitting device 242 may have a circular or semi-circular shape centered on the wireless power transmitter 200, and various embodiments thereof are described below in greater detail with reference to FIG. 9.

According to various embodiments, at least one light emitting device may be disposed outside the first resonator housing 231. The light emitting device may display a wirelessly chargeable area on a plane by irradiating light onto the plane (e.g., an XY plane) where the wireless power transmitter 200 is placed. According to various embodiments, the wirelessly chargeable area displayed by the light emitting device may have a circular or semi-circular shape centered on the wireless power transmitter 200, and various embodiments thereof are described below in detail with reference to FIG. 34.

At least one power generating circuit 172 (e.g., a feeding loop) may be disposed inside the housing 210 and may be connected to generate an electric field for transmitting wireless power, simultaneously or selectively, to the first resonator 230 and the second resonator 240.

According to the embodiment illustrated in FIG. 3, the first resonator housing 231 may be formed to be completely exposed to the outside of the housing 210, but the second resonator housing 241 may be formed to be at least partially inserted into the housing 210. However, shapes related to the housing 210, the first resonator 230, and the second resonator 240 are not limited thereto and may vary.

Figure 4:
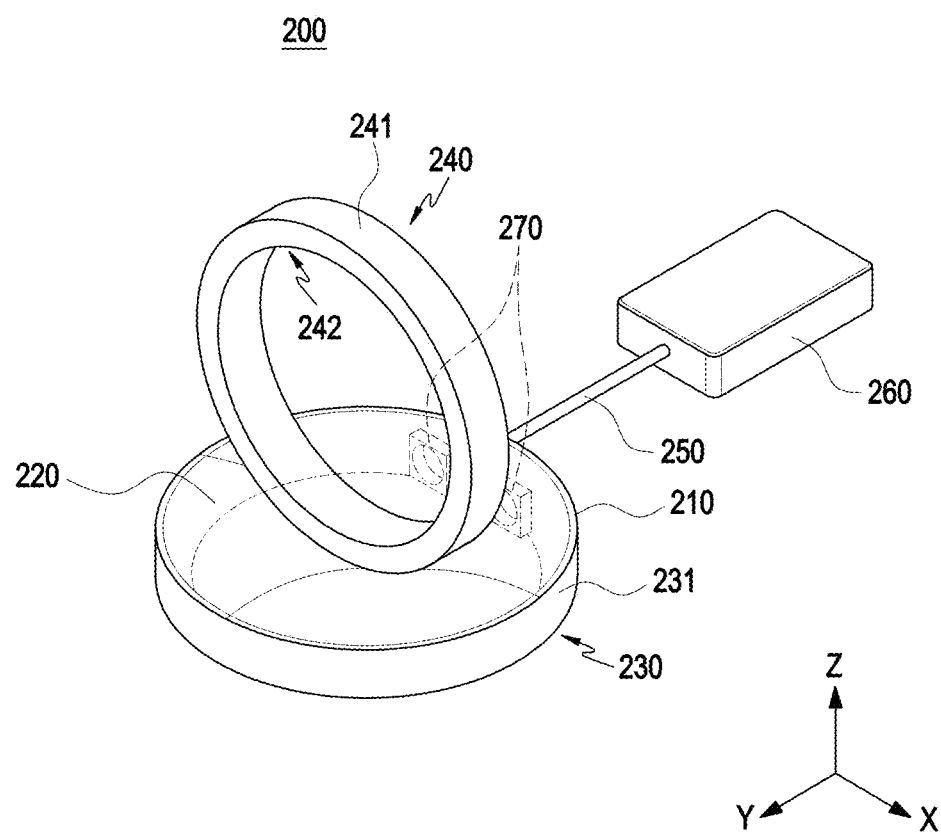
FIG. 4 is a diagram illustrating a wireless power transmitter according to various embodiments.

FIG. 4 is a diagram illustrating an example wireless power transmitter according to various embodiments.

A wireless power transmitter 200 according to the embodiment illustrated in FIG. 4 may also include a housing 210, a display unit 220 formed on one surface of the housing 210, and at least one resonator 230 and 240. The wireless power transmitter 200 illustrated in FIG. 4 may include a structure in which both the first resonator housing 231 and the second resonator housing 241 are exposed to the outside of the housing 210. For example, the second resonator housing 241 may have a shape in which the lower end of the second resonator housing 241 is fixed to the upper surface of the housing 210, rather than a shape in which at least a part thereof is inserted into the housing 210.

According to various embodiments, to downsize or make compact the wireless power transmitter 200, various electronic components (e.g., the processor 102, a short-range communication module 103, the memory 105, the power source 106, and the power transmitting circuit 109) for operation of the wireless power transmitter 200 may be disposed in a system board 260 located outside the housing 210. In this case, an electrical connection between the system board 260 and the wireless power transmitter 200 may be implemented using at least one cable 250.

According to various embodiments, to reduce the heat generated by the wireless power transmission operation of the first resonator 230 and the second resonator 240 of the wireless power transmitter 200, a plurality of fans 270 may be additionally provided inside the wireless power transmitter 200.

Figure 5:
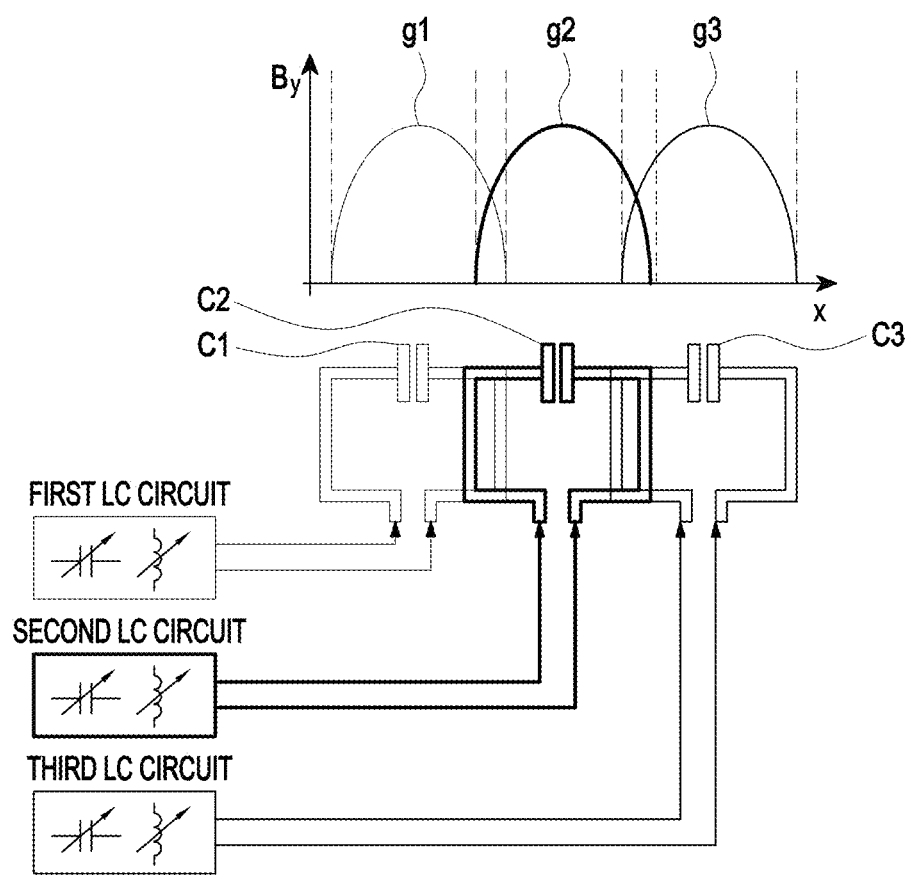
FIG. 5 is a diagram illustrating a phased array coil as a sensor included in a wireless power transmitter according to various embodiments.
Figure 6:
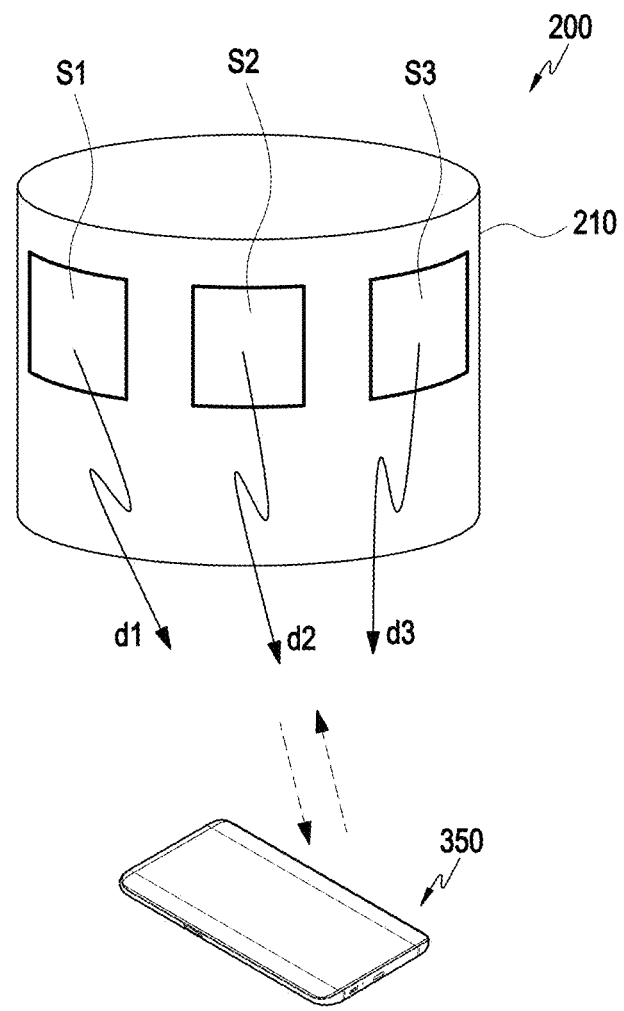
FIG. 6 is a diagram illustrating an ultra-wide band (UWB) radar sensor as a sensor included in a wireless power transmitter according to various embodiments.

FIG. 5 is a diagram illustrating a phased array coil as a sensor included in a wireless power transmitter according to various embodiments. FIG. 6 is a diagram illustrating an ultra-wide band (UWB) radar sensor as a sensor included in a wireless power transmitter according to various embodiments.

According to various embodiments, a wireless power transmitter 200 may include at least one sensor to obtain position information for an electronic device 350 therearound. The position information may include distance information between the wireless power transmitter 200 and the electronic device 350 and direction information for the electronic device measured with respect to the wireless power transmitter 200.

As an example of at least one sensor, as illustrated in FIG. 5, the wireless power transmitter 200 may include a phased array coil. According to various embodiments, at least two or more coils may be provided to form a phased array coil.

According to an embodiment, a phased array coil may be formed by including the first resonator 230 and the second resonator 240.

According to an embodiment, a phased array coil may be further included to obtain position information for the electronic device 350, separately from the first resonator 230 and the second resonator 240. The phased array coil may be disposed to face the outside of the housing 210.

According to various embodiments, the phased array coil may be connected to an L/C circuit including at least one variable capacitor and at least one variable coil to enable phase adjustment of radio waves radiated from the coil. For example, as illustrated in FIG. 5, in the case of having three phased array coils, a first phased array coil C1 may be connected with a first L/C including at least one variable capacitor and at least one variable coil, a second phased array coil C2 may be connected with a second L/C circuit including at least one variable capacitor and at least one variable coil, and a third phased array coil C3 may be connected with a third L/C circuit including a variable capacitor and at least one variable coil.

As a method for obtaining position information for the electronic device 350 using the phased array coils, the phase may be changed by switching the L/C circuit connected to each coil. Further, when the phased array coil transmits phase-varied radio waves, the power level of the electronic device 350 may be sensed, and the phase at which the power level is the maximum may be found. The power level of the electronic device 350 may be sensed through voltage information and current information received from the electronic device 350. The power levels of the electronic device 350 may be shown as graphs g1, g2, and g3 of FIG. 5, and may have the maximum value where the graphs overlap. The position of the electronic device 350 having the so-measured maximum power level may be calculated and detected by triangulation using the three phased array coils.

The phased array coil according to various embodiments of the disclosure may be configured by combining at least two or more coils, e.g., three or more coils. By utilizing a phased array coil having at least two coils, it is possible to direct a load detection beacon and/or a power beacon transmitted from the phased array coil in a specific direction. Thus, it is possible to obtain information for the position of the other electronic device 350 around the wireless power transmitter 200. As the number of phased array coils increases, the accuracy (resolution) of the position information may be enhanced.

According to various embodiments, the wireless power transmitter 200 may include a UWB radar sensor in addition to, or instead of, the phased array coil.

Referring to FIG. 6, a UWB module may be disposed on one surface of the housing 210 of the wireless power transmitter 200. At least two or more UWB modules may be provided to face the outside of the housing 210.

As a method for obtaining position information for the electronic device using the UWB module, the UWB module may transmit a pulse signal, and the signal reflected by the electronic device 350 may be received, thereby calculating the distance.

For example, when three UWB modules are provided as illustrated in FIG. 6, a first UWB module S1 may transmit a first pulse, a second UWB module S2 may transmit a second pulse, and a third UWB module S3 may transmit a third pulse. The distance d1 between the first UWB module S1 and the electronic device 350 may be measured through the reflected signal for the first pulse, the distance d2 between the second UWB module S2 and the electronic device 350 may be measured through the reflected signal for the second pulse, and the distance d3 between the third UWB module S3 and the electronic device 350 may be measured through the reflected signal for the third pulse. The position of the electronic device 350 may be detected using the distance information d1, d2, and d3 and the triangulation.

According to various embodiments, the wireless power transmitter 200 may further include an auxiliary sensor (e.g., an IR sensor) for measuring the distance from the electronic device 350, thereby increasing the accuracy of position information.

Using the above-described UWB modules, not only the position of the electronic device 350 but also changes in distance according to the movement of the electronic device 350 and priority settings according to the user's motion may be additionally performed.

Figure 7:
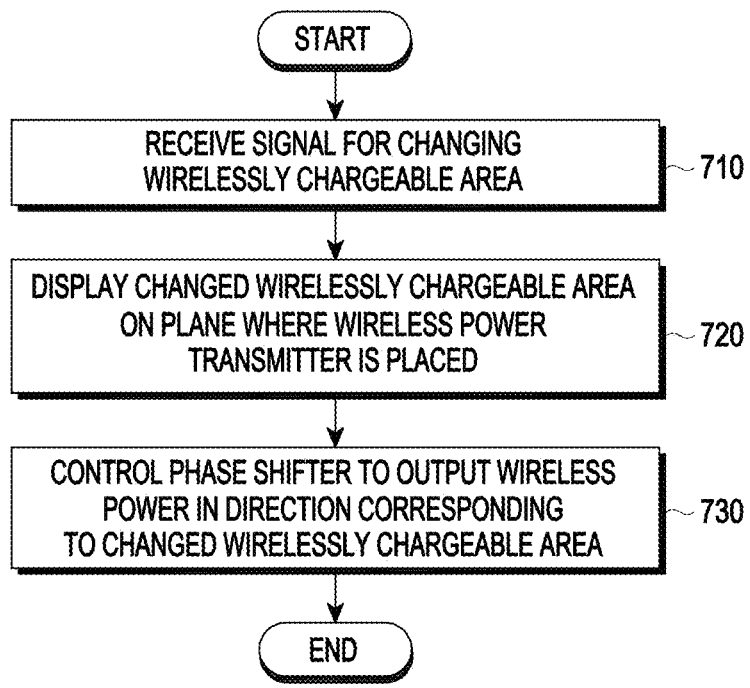
FIG. 7 is a flowchart illustrating example operations of a wireless power transmitter according to various embodiments.

FIG. 7 is a flowchart illustrating example operations of a wireless power transmitter according to various embodiments.

Referring to FIG. 7, an electronic device (e.g., the wireless power transmitter 200) (e.g., the processor 102 of the wireless power transmitter 100 of FIG. 2A) may receive a signal for changing the wirelessly chargeable area (e.g., a signal for changing from a first area to a second area) in operation 710. According to various embodiments, the signal for changing the wirelessly chargeable area may be received in response to a chargeable area change setting input from the user. An embodiment thereof is described in greater detail below with reference to FIG. 23. According to an embodiment, the signal for changing the wirelessly chargeable area may be generated within the wireless power transmitter 200 based on the position in which an external electronic device (e.g., the electronic device 350) for wireless charging is placed. A specific embodiment thereof is described in detail with reference to FIG. 24.

In operation 720, the electronic device (e.g., the wireless power transmitter 200) (e.g., the processor 102 of the wireless power transmitter 100 of FIG. 2A) may display the wirelessly chargeable area changed from the previous wirelessly chargeable area on the plane (e.g., the XY plane of FIG. 3) where the electronic device (e.g., the wireless power transmitter 200) is placed. An embodiment thereof is described in greater detail below with reference to FIGS. 14 and 15.

In operation 730, the electronic device (e.g., the wireless power transmitter 200) (e.g., the processor 102 of the wireless power transmitter 100 of FIG. 2A) may control at least one phase shifter to output wireless power in a direction corresponding to the changed wirelessly chargeable area. An embodiment thereof is described in greater detail below with reference to FIGS. 39 and 40.

Figure 8:
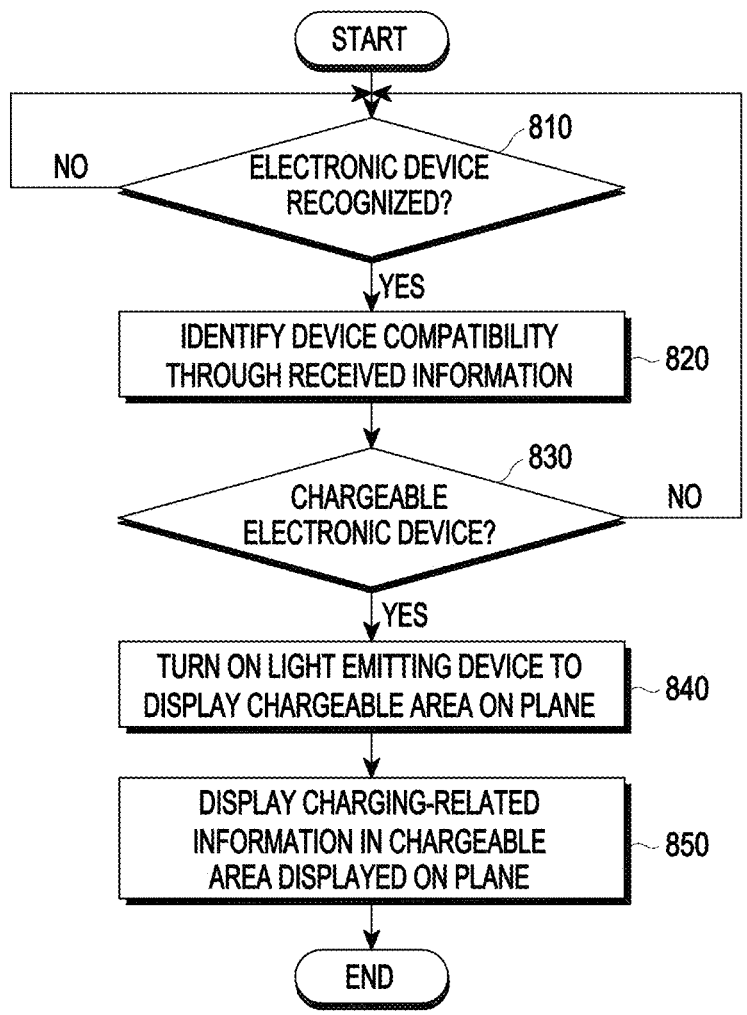
FIG. 8 is a flowchart illustrating example operations of a wireless power transmitter according to various embodiments.

FIG. 8 is a flowchart illustrating example operations of a wireless power transmitter according to various embodiments.

Referring to FIG. 8, in operation 810, an electronic device (e.g., the wireless power transmitter 200) (e.g., the processor 102 of the wireless power transmitter 100 of FIG. 2A) may recognize an external electronic device (e.g., the electronic device 350) and, in operation 820, the electronic device may identify device compatibility through the information received from the external electronic device.

When the recognized external electronic device (e.g., the electronic device 350) is determined to be a chargeable electronic device as a result of identifying device compatibility in operation 830, the electronic device (e.g., the wireless power transmitter 200) (e.g., the processor 102 of the wireless power transmitter 100 of FIG. 2A) may turn on a light emitting device (e.g., the light emitting device 242 of FIG. 3) to display the wirelessly chargeable area on the plane (e.g., the XY plane of FIG. 3) where the electronic device (e.g., the wireless power transmitter 200) is placed in operation 840. According to various embodiments, when the recognized external electronic device is determined not to be a chargeable electronic device as a result of identifying device compatibility in operation 830, the light emitting device may not be turned on so that the wirelessly chargeable area is not displayed on the plane, thereby allowing the user to easily and intuitively identify whether the external electronic device is chargeable.

According to various embodiments, in operation 850, the electronic device (e.g., the wireless power transmitter 200) (e.g., the processor 102 of the wireless power transmitter 100 of FIG. 2A) may further display various types of charging-related information in the wirelessly chargeable area displayed on the plane. Various relevant examples are described in greater detail below.

Figure 9:
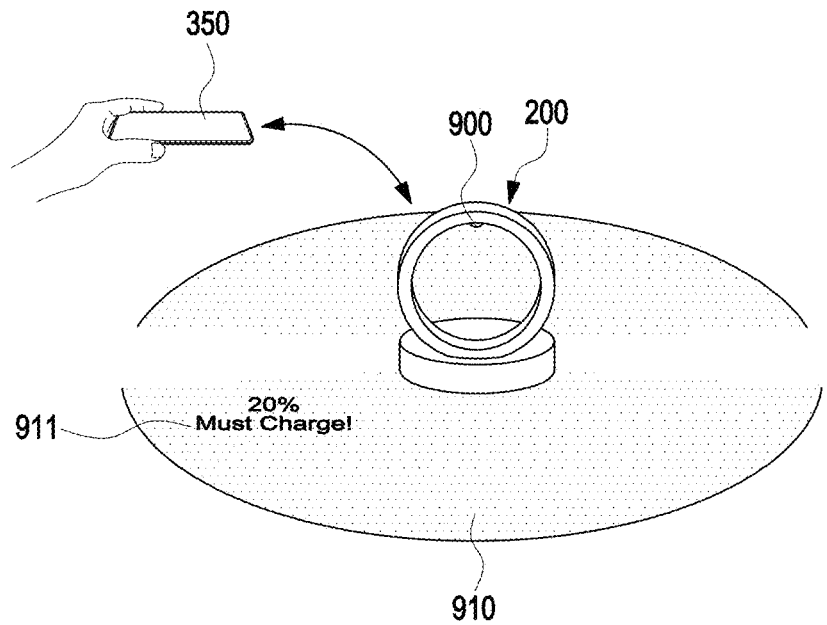
FIG. 9 is a diagram illustrating an example of displaying charging information by a wireless power transmitter according to various embodiments.

FIG. 9 is a diagram illustrating an example of displaying charging information by a wireless power transmitter according to various embodiments.

Referring to FIG. 9, a wireless power transmitter 200 may have at least one light emitting device 900 (e.g., the light emitting device 242 of FIG. 3) inside an upper portion of the second resonator housing 241. According to various embodiments, the at least one light emitting device 900 may include, for example, and without limitation, at least one of an LD, an LED, a beam projector, or the like. As the light emitting device 900 emits light, a wirelessly chargeable area 910 may be displayed on the plane on which the wireless power transmitter 200 is placed as described above in connection with FIGS. 7 and 8. According to various embodiments, the method or form of displaying the wirelessly chargeable area 910 may be varied depending on at least one of the type (e.g., LD, LED, or beam projector), position, direction, or number of the light emitting devices 900. This is described below in greater detail.

According to various embodiments, the wireless power transmitter 200 may control the light emitting device 900 not to turn on when the external electronic device (e.g., the electronic device 350) is not being charged. If the user brings the electronic device 350 close to the wireless power transmitter 200 to be located within the wirelessly chargeable range of the wireless power transmitter 200 or within a range in which the wireless power transmitter is able to detect the electronic device 350 as illustrated in FIG. 9, the light emitting device 900 may be turned on to display the wirelessly chargeable area 910 on the plane. According to various embodiments, charging-related information may be additionally displayed in the wirelessly chargeable area 910, and the charging-related information may be displayed using at least one of text, an image, and a color. For example, when the wireless power transmitter 200 recognizes the electronic device 350 as illustrated in FIG. 9, the wireless power transmitter 200 may display charging-related information (e.g., 20% Must charge!) in the wirelessly chargeable area 910 based on the information received from the electronic device 350, allowing the user to intuitively identify information for charging status. Further, when the electronic device 350 is positioned close to the wireless power transmitter 200 and is thus chargeable, the light emitting device 900 may be turned on to display the wirelessly chargeable area 910 on the plane, so that the user may intuitively and easily identify whether the electronic device 350 is chargeable.

Figure 10:
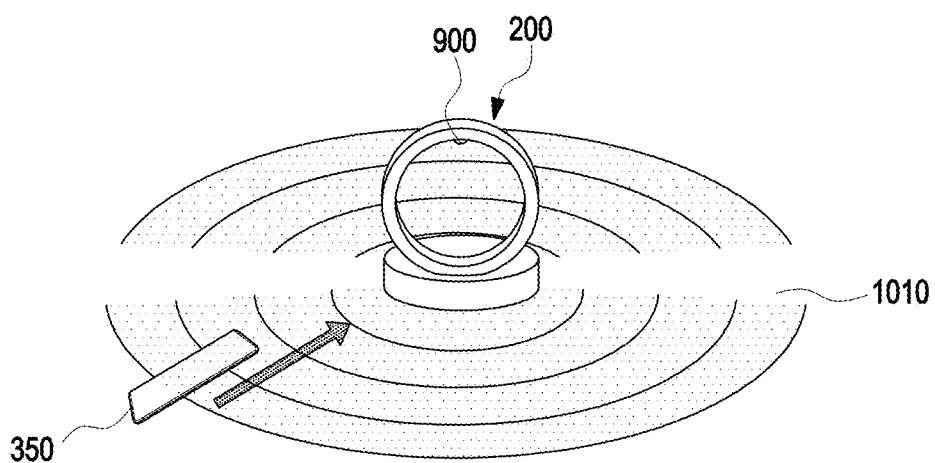
FIG. 10 is a diagram illustrating an example of displaying charging information by a wireless power transmitter according to various embodiments.

FIG. 10 is a diagram illustrating an example of displaying charging information by a wireless power transmitter according to various embodiments.

Referring to FIG. 10, if the user brings the electronic device 350 close to the wireless power transmitter 200 to be located within the wirelessly chargeable range of the wireless power transmitter 200 or within a range in which the wireless power transmitter is able to detect, the light emitting device 900 may be turned on to display the wirelessly chargeable area 1010 on the plane. According to various embodiments, if the user brings the electronic device 350 close to the wireless power transmitter 200 to be positioned within a range in which the wireless power transmitter 200 may charge or detect while the light emitting device 900 is on, the way in which the light emitting device 900 displays may be changed, thereby informing the user whether the wireless power transmitter 200 is able to detect or charge.

According to various embodiments, when the electronic device 350 is positioned at the edge of the wirelessly chargeable area 1010, text or an image (e.g., an arrow) may be displayed to reposition the electronic device, e.g., bring the electronic device 350 closer to the wireless power transmitter 200 to thereby increase charging efficiency. The user may identify the guiding text or image and bring the electronic device 350 closer to the wireless power transmitter 200 in the wirelessly chargeable area 1010, thereby leading to quicker charging.

Figure 11:
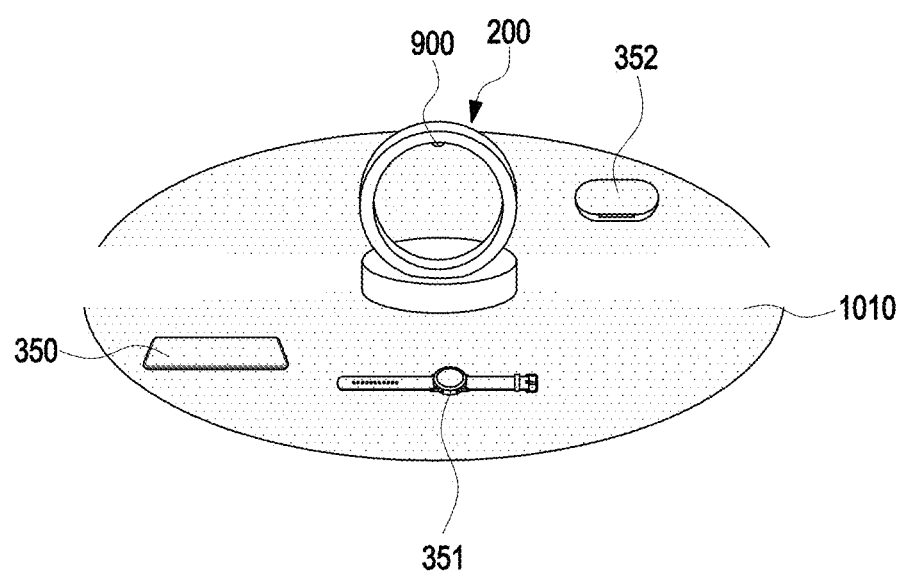
FIG. 11 is a diagram illustrating an example of displaying charging information by a wireless power transmitter according to various embodiments.

FIG. 11 is a diagram illustrating an example of displaying charging information by a wireless power transmitter according to various embodiments.

Referring to FIG. 11, when charging the plurality of electronic devices 350, 351, and 352, the wireless power transmitter 200 may turn on the light emitting device 900 to display the wirelessly chargeable area 1010 on the plane. The user may recognize that the plurality of electronic devices 350, 351, and 352 are being wirelessly charged by identifying that the plurality of electronic devices 350, 351, and 352 are disposed in the wirelessly chargeable area 1010.

Figure 12:
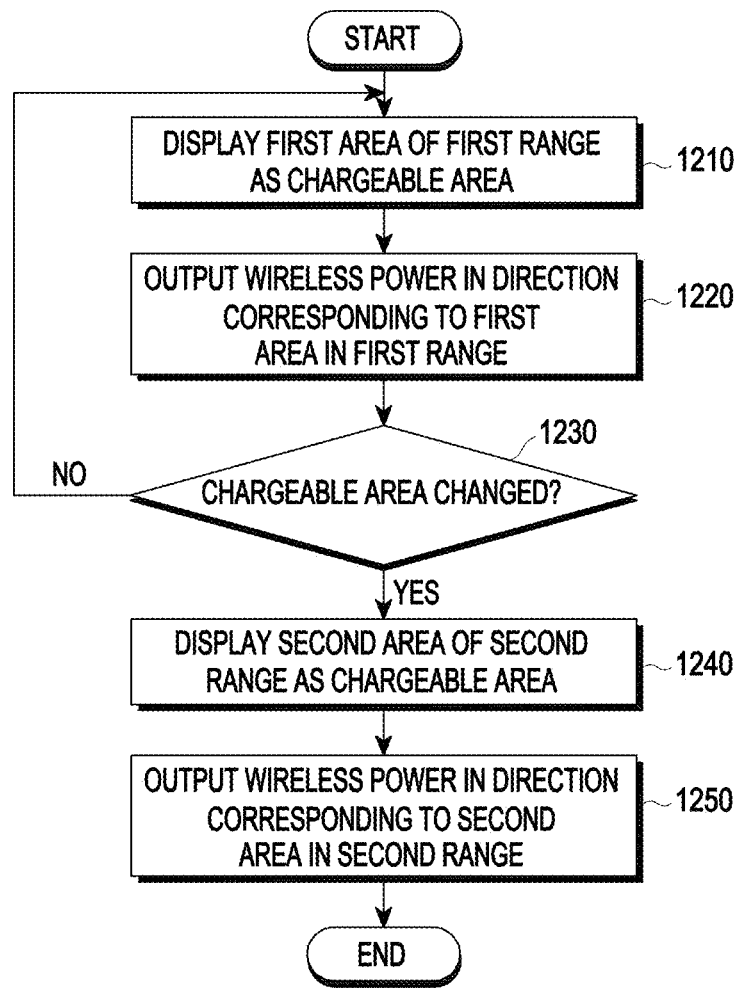
FIG. 12 is a flowchart illustrating example operations of a wireless power transmitter according to various embodiments.
Figure 14:
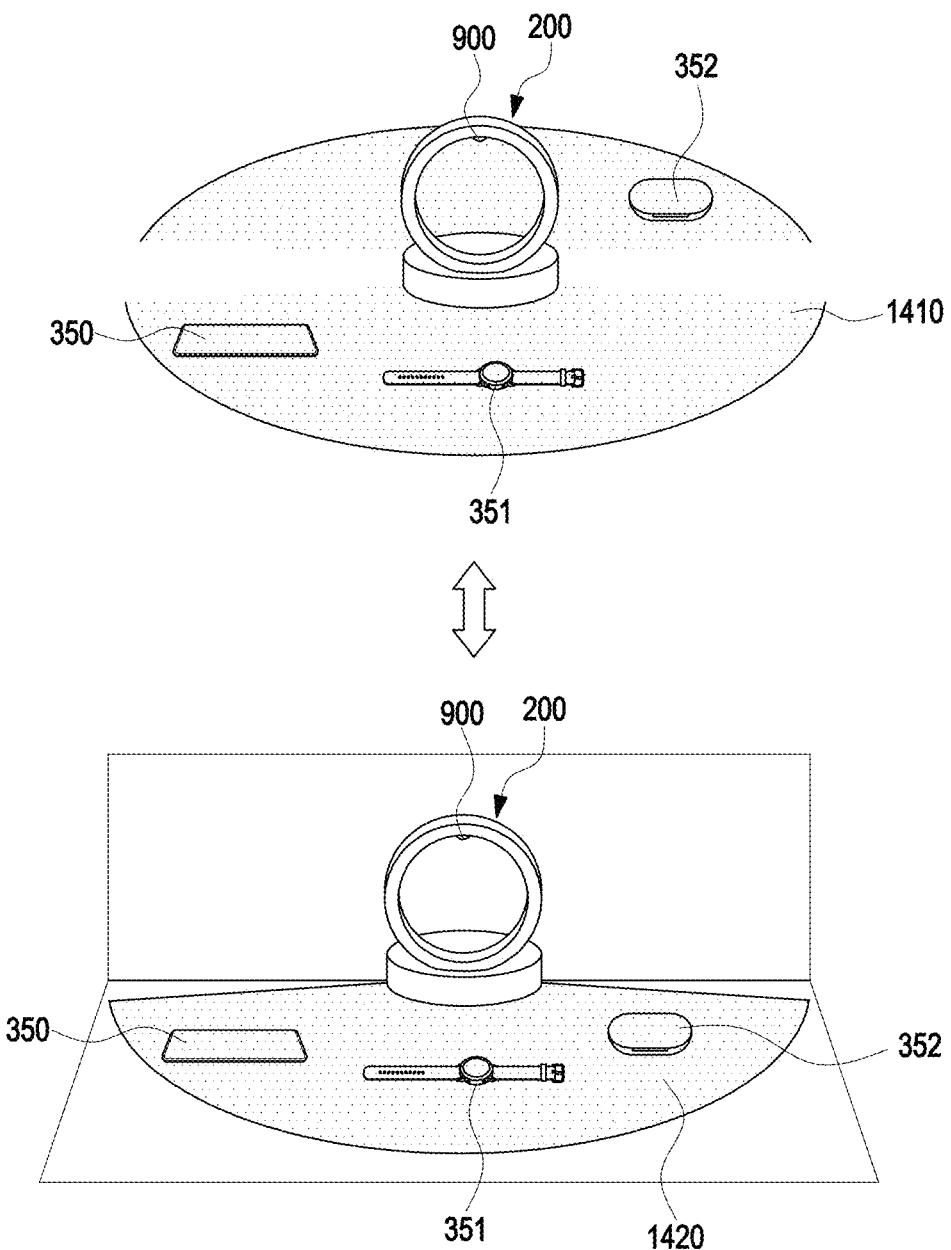
FIG. 14 is a diagram illustrating an example of displaying a chargeable area by a wireless power transmitter according to various embodiments.

FIG. 12 is a flowchart illustrating example operations of a wireless power transmitter according to various embodiments. FIG. 14 is a diagram illustrating an example of displaying a chargeable area by a wireless power transmitter according to various embodiments.

Referring to FIGS. 12 and 14, in operation 1210, an electronic device (e.g., the wireless power transmitter 200) (e.g., the processor 102 of the wireless power transmitter 100 of FIG. 2A) may display a first area in a first range (e.g., 360 degrees) as a chargeable area. For example, as illustrated in the upper portion of FIG. 14, the 360-degree first area 1410 may be displayed as a chargeable area. According to various embodiments, in operation 1220, the electronic device (e.g., the wireless power transmitter 200) (e.g., the processor 102 of the wireless power transmitter 100 of FIG. 2A) may output wireless power in a direction corresponding to the first area 1410 in the first range. As illustrated in the upper portion of FIG. 14, it may be identified that the plurality of electronic devices 350, 351, and 352 disposed in the first area 1410 are being supplied wireless power and charged.

According to various embodiments, in operation 1230, the electronic device (e.g., the wireless power transmitter 200) (e.g., the processor 102 of the wireless power transmitter 100 of FIG. 2A) may receive a signal for changing the wirelessly chargeable area. According to various embodiments, the signal for changing the wirelessly chargeable area may be received by a chargeable area change setting input from the user. An embodiment thereof is described in greater detail below with reference to FIG. 23. According to an embodiment, the signal for changing the wirelessly chargeable area may be generated based on the position in which an external electronic device (e.g., the target device to be charged) for wireless charging is placed. A specific embodiment thereof is described in detail with reference to FIG. 24.

In operation 1240, the electronic device (e.g., the wireless power transmitter 200) (e.g., the processor 102 of the wireless power transmitter 100 of FIG. 2A) may display a second area in a second range (e.g., 180 degrees) according to the change of the wirelessly chargeable area. For example, as illustrated in the lower portion of FIG. 14, the 180-degree second area 1420 may be displayed as a chargeable area. According to various embodiments, in operation 1250, the electronic device (e.g., the wireless power transmitter 200) (e.g., the processor 102 of the wireless power transmitter 100 of FIG. 2A) may output wireless power in a direction corresponding to the second area 1420 in the second range. As illustrated in the lower portion of FIG. 14, it may be identified that the plurality of electronic devices 350, 351, and 352 disposed in the second area 1420 are being supplied wireless power and charged.

According to various embodiments, as illustrated in FIG. 14, the wirelessly chargeable area may be changed according to the user's charging environment. For example, in a situation where space is secured in all directions, the wirelessly chargeable area may be displayed in a 360-degree range as illustrated in the upper portion of FIG. 14, and in a narrow personal space, such as on a desk, the wirelessly chargeable area may be displayed in a 180-degree range as illustrated in the lower portion of FIG. 14. According to various embodiments, in a narrower space or near a corner, the wirelessly chargeable area 1510 may be displayed in a range of 90 degrees or less than 90 degrees as illustrated in FIG. 15.

Figure 15:
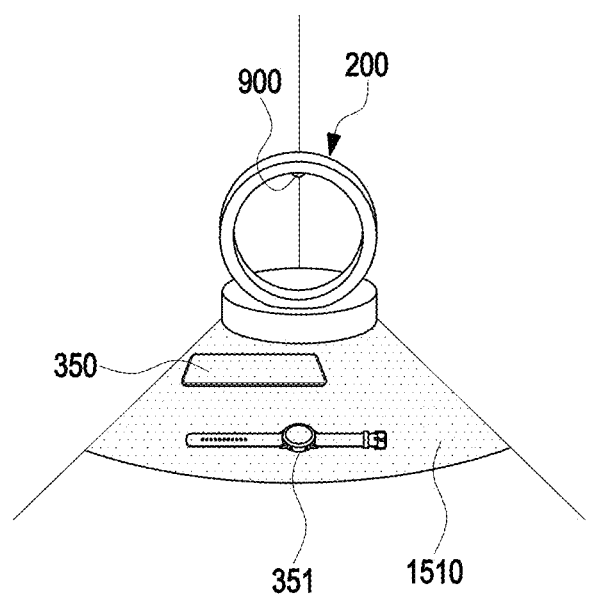
FIG. 15 is a diagram illustrating an example of displaying a chargeable area by a wireless power transmitter according to various embodiments.

According to various embodiments, referring to FIGS. 14 and 15, if the angle of the wirelessly chargeable area around the wireless power transmitter 200 decreases (e.g., 350 degrees->180 degrees, or 180 degrees->90 degrees) as the wirelessly chargeable area changes, the radius of the wirelessly chargeable area may increase. In contrast, if the angle of the wirelessly chargeable area around the wireless power transmitter 200 increases (e.g., 90 degrees->180 degrees, or 180 degrees->360 degrees) as the wirelessly chargeable area changes, the radius of the wirelessly chargeable area may reduce.

Figure 13:
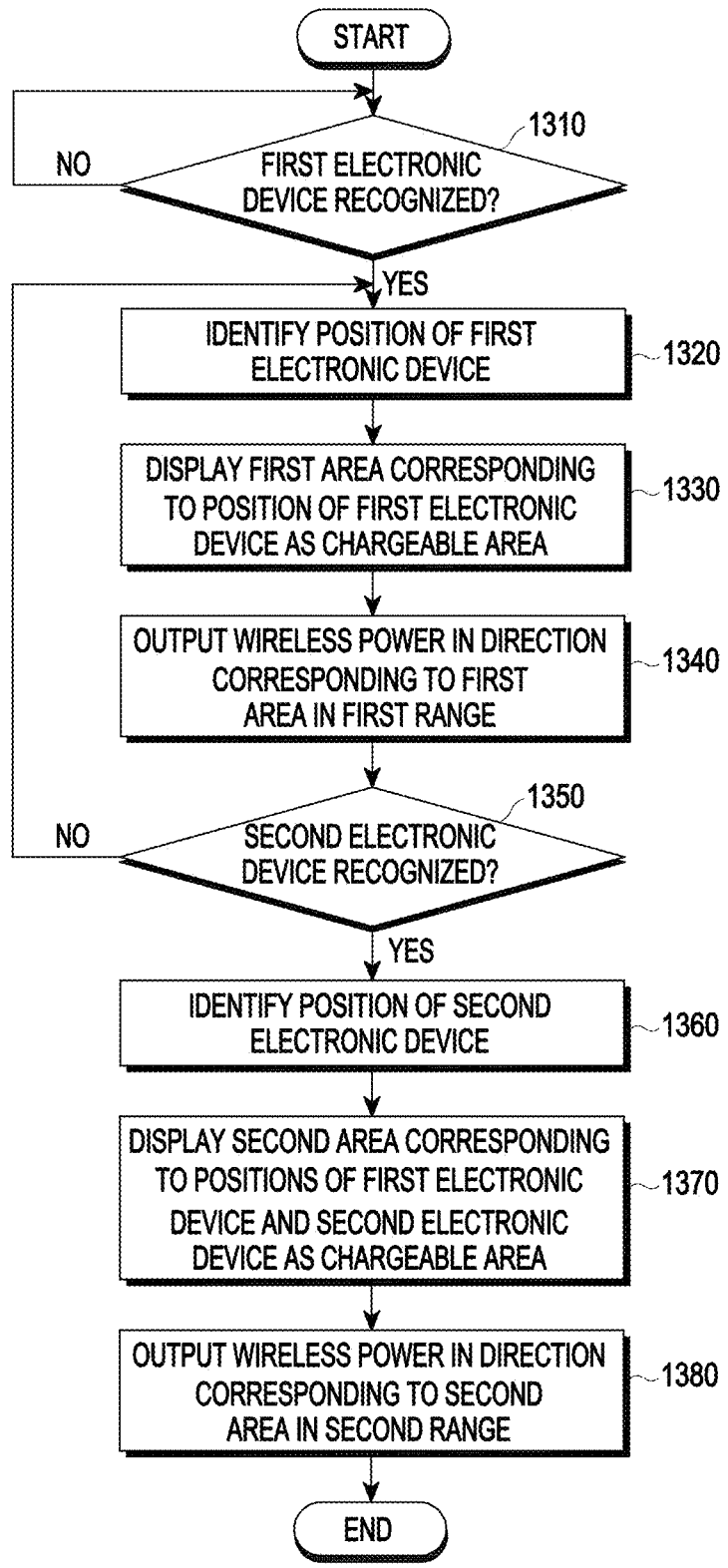
FIG. 13 is a flowchart illustrating example operations of a wireless power transmitter according to various embodiments.

FIG. 13 is a flowchart illustrating example operations of a wireless power transmitter according to various embodiments.

Referring to FIG. 13, if a first electronic device is recognized in operation 1310, an electronic device (e.g., the wireless power transmitter 200) (e.g., the processor 102 of the wireless power transmitter 100 of FIG. 2A) may identify the position of the first electronic device in operation 1320. According to various embodiments, in operation 1330, the electronic device may display a first area corresponding to the position of the first electronic device as a chargeable area. In operation 1340, the electronic device may output wireless power in a direction corresponding to the first area in a first range.

According to various embodiments, if a second electronic device is recognized in operation 1350, the electronic device may identify the position of the second electronic device in operation 1360. According to various embodiments, in operation 1370, the electronic device may display a second area corresponding to the positions of the first electronic device and the second electronic device (e.g., including the position of the first electronic device and the position of the second electronic device) as a chargeable area. In operation 1380, the electronic device may output wireless power in a direction corresponding to the second area in a second range.

According to various embodiments, when or whenever an electronic device to be charged is added, the electronic device (e.g., the wireless power transmitter 200) (e.g., the processor 102 of the wireless power transmitter 100 of FIG. 2A) may identify the position of the added electronic device and display an area covering all of the positions as a chargeable area. For example, if the first electronic device is disposed in a first direction from the wireless power transmitter 200, the wirelessly chargeable area may be set to have a 90-degree or 180-degree range, corresponding to the direction. Thereafter, if the second electronic device is disposed in a second direction, which is opposite to the first direction, from the wireless power transmitter 200, the wirelessly chargeable area may be changed and set to have a 360-degree range to be able to simultaneously charge the first electronic device and the second electronic device.

Figure 16:
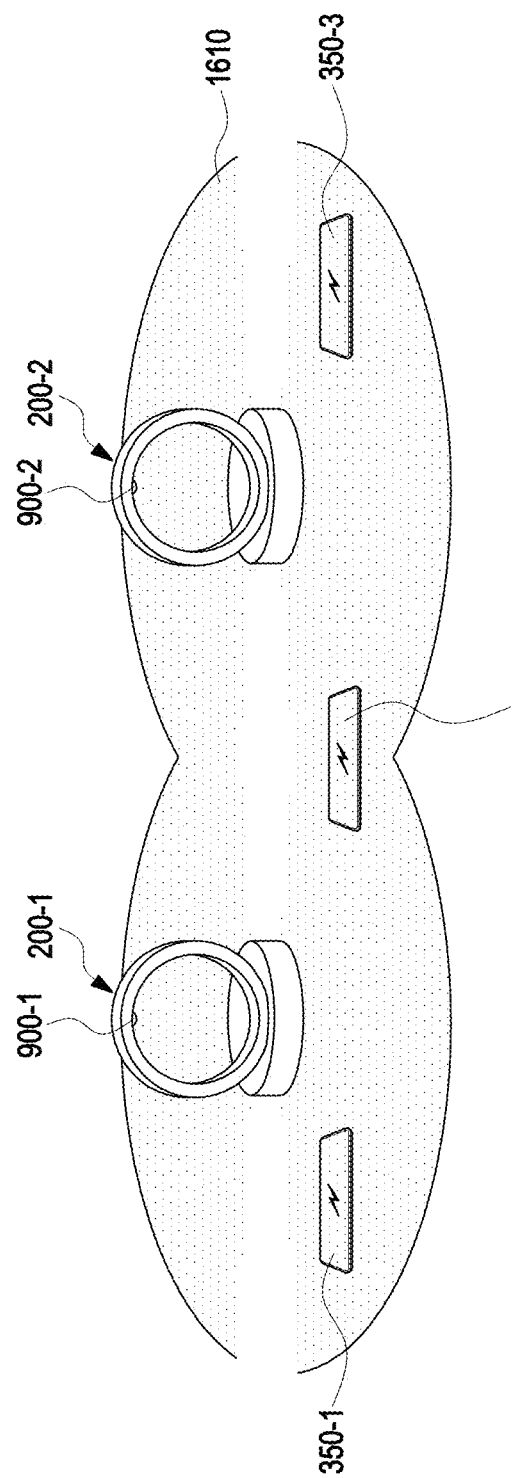
FIG. 16 is a diagram illustrating an example of displaying a chargeable area by a wireless power transmitter according to various embodiments.

FIG. 16 is a diagram illustrating an example of displaying a chargeable area by a wireless power transmitter according to various embodiments. Referring to FIG. 16, when two wireless power transmitters 200-1 and 200-2 are disposed adjacent to each other, a wirelessly chargeable area 1610 may be formed as the wirelessly chargeable areas generated by light emitting devices 900-1 and 900-2 included in the wireless power transmitters overlap each other.

According to various embodiments, as illustrated in FIG. 16, a first electronic device 350-1 disposed in the wirelessly chargeable area of the first wireless power transmitter 200-1 may receive wireless power from the first wireless power transmitter 200-1. A third electronic device 350-3 disposed in the wirelessly chargeable area of the second wireless power transmitter 200-2 may receive wireless power from the second wireless power transmitter 200-2. A second electronic device 350-2 disposed in an overlapping area of the wirelessly chargeable area of the first wireless power transmitter 200-1 and the wirelessly chargeable area of the second wireless power transmitter 200-2 may simultaneously receive power from the first wireless power transmitter 200-1 and the second wireless power transmitter 200-2.

Figure 17:
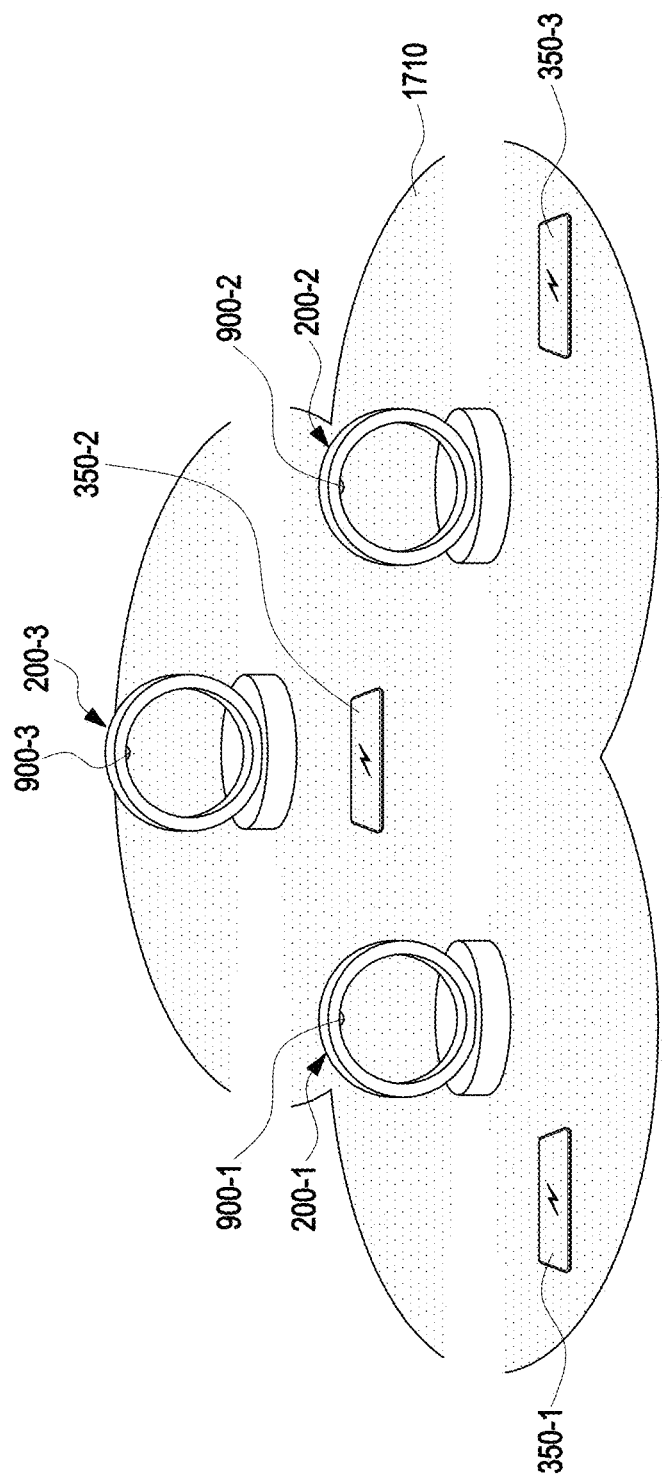
FIG. 17 is a diagram illustrating an example of displaying a chargeable area by a wireless power transmitter according to various embodiments.

FIG. 17 is a diagram illustrating an example of displaying a chargeable area by a wireless power transmitter according to various embodiments. Referring to FIG. 17, a wireless power transmitter 200-3 (including light emitting device 900-3) may be disposed in addition to the two wireless power transmitters 200-1 and 200-2 of FIG. 16. For example, the first wireless power transmitter 200-1, the second wireless power transmitter 200-2, and the third wireless power transmitter 200-3 are disposed to be spaced apart from each other at regular intervals, forming overlapping wirelessly chargeable areas. According to various embodiments, by expanding the concept of FIG. 17, it is possible to cover an entire area of a larger space as a wirelessly chargeable area by repeatedly placing a plurality of wireless power transmitters apart from each other by a predetermined distance.

Figure 18:
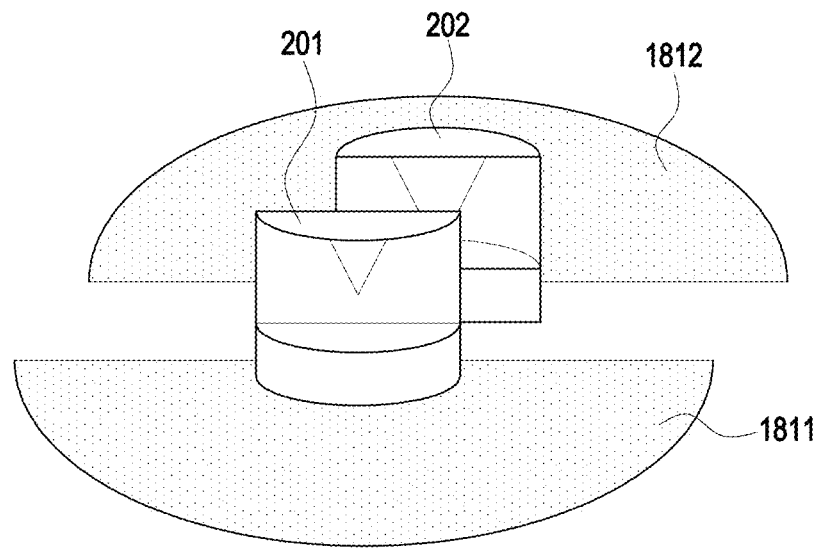
FIG. 18 is a diagram illustrating an example of displaying a chargeable area by a wireless power transmitter according to various embodiments.

FIG. 18 is a diagram illustrating an example of displaying a chargeable area by a wireless power transmitter according to various embodiments. Referring to FIG. 18, the wireless power transmitters 201 and 202 may be configured to cover a 180-degree area 1811 and another 180-degree area 1812, respectively. For example, a 360-degree area may be covered as a wirelessly chargeable area by disposing the first wireless power transmitter 201 and the second wireless power transmitter 202 as shown.

Figure 19:
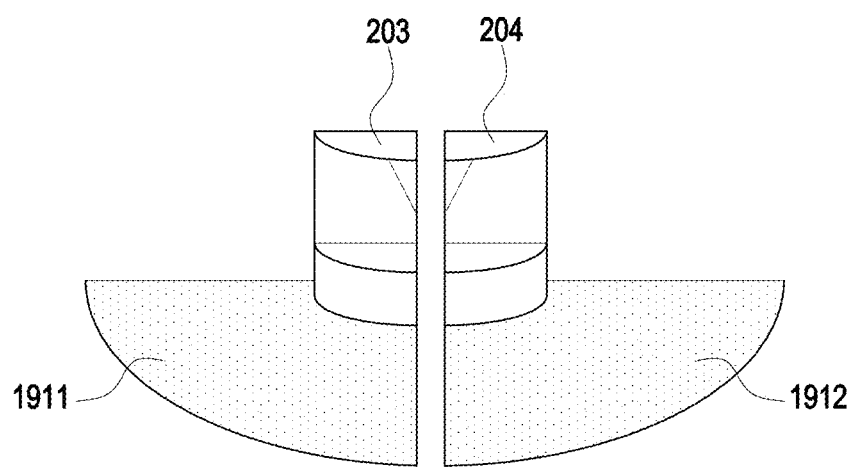
FIG. 19 is a diagram illustrating an example of displaying a chargeable area by a wireless power transmitter according to various embodiments.

FIG. 19 is a diagram illustrating an example of displaying a chargeable area by a wireless power transmitter according to various embodiments. Referring to FIG. 19, the wireless power transmitters 203 and 204 may be configured to cover a 90-degree area 1911 and another 90-degree area 1912, respectively. For example, a 180-degree area may be covered as a wirelessly chargeable area by disposing the third wireless power transmitter 203 and the fourth wireless power transmitter 204 as shown.

Figure 20:
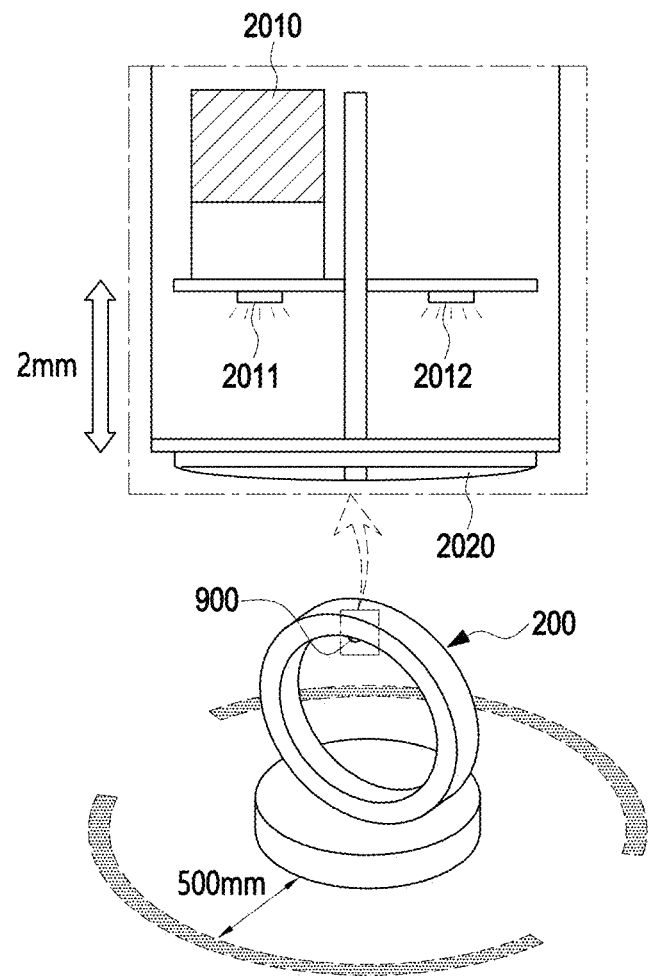
FIG. 20 is a diagram illustrating an example light emitting device included in a wireless power transmitter according to various embodiments.
Figure 21:
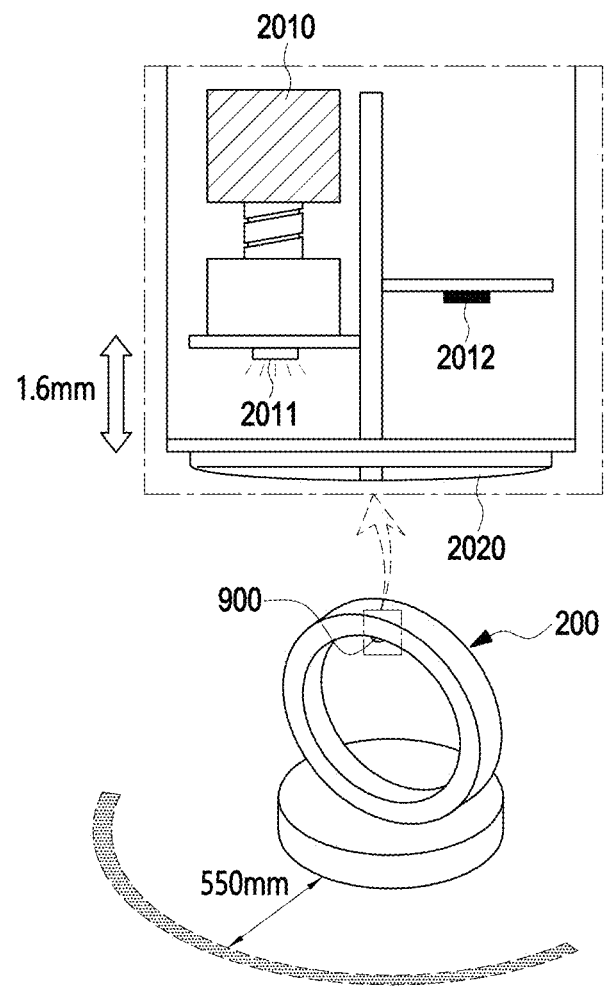
FIG. 21 is a diagram illustrating an example light emitting device included in a wireless power transmitter according to various embodiments.
Figure 22:
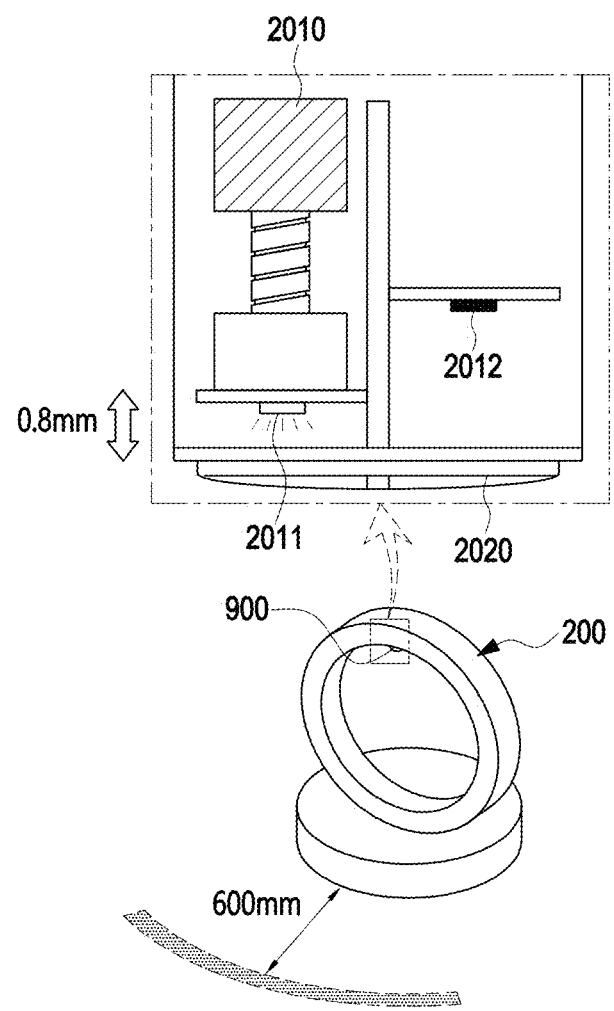
FIG. 22 is a diagram illustrating an example light emitting device included in a wireless power transmitter according to various embodiments.

FIGS. 20, 21, and 22 are diagrams illustrating an example light emitting device included in a wireless power transmitter according to various embodiments. Referring to FIG. 20, a light emitting device may include a plurality of light sources 2011 and 2012 and a lens 2020. According to various embodiments, a first light source 2011 and a second light source 2012 may be controlled to be independently turned on by a processor, and at least one light source (e.g., the first light source 2011) may be adjusted for distance from the lens 2020 by a driver 2010.

Referring to FIG. 20, when the first light source 2011 and the second light source 2012 are simultaneously turned on, a 360-degree area may be displayed as a wirelessly chargeable area as illustrated. Referring to FIG. 21, control may be performed to turn off the second light source 2012 while turning on the first light source 2011. The driver 2010 may be controlled to move the first light source 2011 so that the distance between the first light source 2011 and the lens 2020 is reduced (e.g., 1.6 mm) as compared with the distance (e.g., 2 mm) of FIG. 20. Thus, as illustrated in FIG. 21, the wirelessly chargeable area is changed into a 180-degree area, and the chargeable radius may become larger (e.g., 550 mm) than the radius (e.g., 500 mm) of FIG. 20.

According to various embodiments, referring to FIG. 22, control may be performed to turn off the second light source 2012 while turning on the first light source 2011. As at least one of the first and second light sources moves downward in an orthogonal direction to the plane where the electronic device is placed, the wirelessly chargeable area boundaries are changed such that an arc length of the wireless chargeable area decreases as the radius from the central axis of the wireless power transmitter to the arc length of the wirelessly chargeable area increases. For example, the driver 2010 may be controlled to move the first light source 2011 so that the distance between the first light source 2011 and the lens 2020 is reduced (e.g., 0.8 mm) as compared with the distance (e.g., 1.6 mm) of FIG. 21. Thus, as illustrated in FIG. 22, the wirelessly chargeable area is changed into an area in a smaller range (e.g., a 90-degree range) than 180 degrees, and the chargeable radius may become larger (e.g., 600 mm) than the radius (e.g., 550 mm) of FIG. 21.

Figure 23:
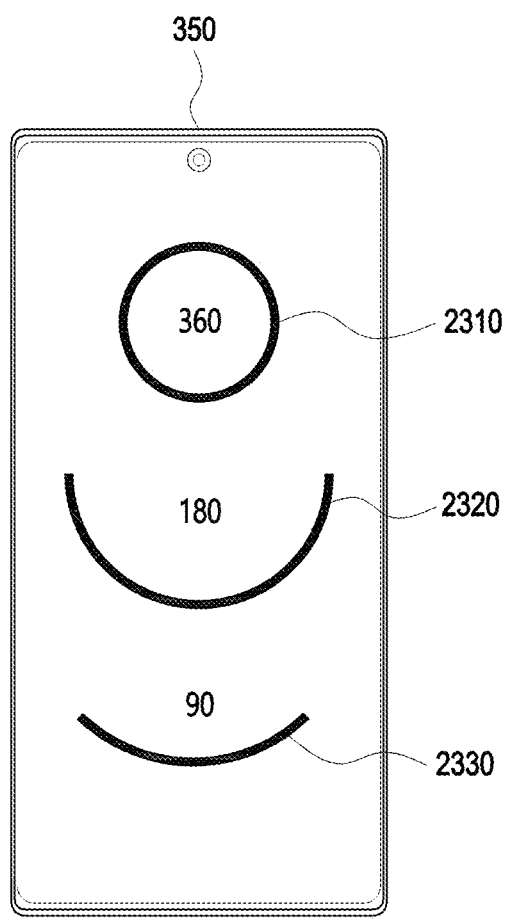
FIG. 23 is a diagram illustrating a screen related to changing a chargeable area in an electronic device according to various embodiments.

FIG. 23 is a diagram illustrating a screen related to changing a chargeable area in an electronic device according to various embodiments.

Referring to FIG. 23, a wireless power transmitter 200 or an electronic device 350 may display a screen for setting a chargeable area. For example, it may display a 360-degree shape 2310, a 180-degree shape 2320, and a 90-degree shape 2330, and the user may select any one to set a charging area. According to various embodiments, when the chargeable area is set through the screen of the electronic device 350, setting information for the chargeable area may be transmitted to the wireless power transmitter 200. The wireless power transmitter 200 may receive the setting information for the chargeable area from the electronic device 350 and output charging power to the electronic device 350 within the area corresponding to the setting information.

Figure 24:
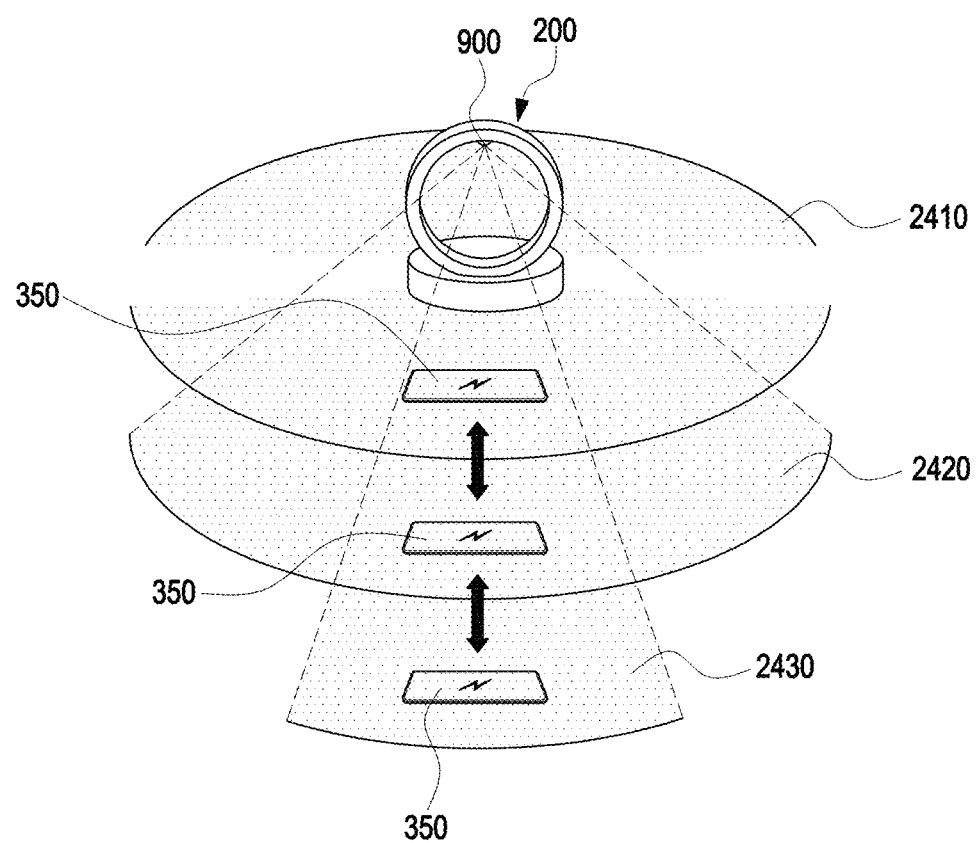
FIG. 24 is a diagram illustrating an example of displaying a chargeable area by a wireless power transmitter according to various embodiments.

FIG. 24 is a diagram illustrating an example of displaying a chargeable area by a wireless power transmitter according to various embodiments.

Referring to FIG. 24, a wirelessly chargeable area may be automatically set depending on the position or distance of the electronic device 350 recognized by the wireless power transmitter 200. According to various embodiments, the position or distance of the electronic device 350 may be identified by the method described above in connection with FIGS. 5 and 6.

For example, as illustrated in FIG. 24, as the electronic device 350 is disposed closer to the wireless power transmitter 200, the angle of the wirelessly chargeable area may increase. On the other hand, as the electronic device 350 is disposed further away from the wireless power transmitter 200, the angle of the wirelessly chargeable area may decrease.

According to various embodiments, if the electronic device 350 is positioned furthest from the wireless power transmitter 200 in FIG. 24, the wirelessly chargeable area may be set to a first area 2430 where the angle of the wirelessly chargeable area is smallest, to allow power transmission to reach the distance. According to various embodiments, if the electronic device 350 comes closer the wireless power transmitter 200 and is positioned in an intermediate distance in FIG. 24, the wirelessly chargeable area may be set to a second area 2420 in which the angle of the wirelessly chargeable area has been increased, so as to transmit power up to the distance. In FIG. 24, if the electronic device 350 further approaches the wireless power transmitter 200 at a smallest distance, the wirelessly chargeable area may be set to a third area 2410 in which the angle of the wirelessly chargeable area has been further increased, to transmit power up to the distance.

FIGS. 25A, 25B, 25C, and 25D are diagrams illustrating examples of displaying charging information by a wireless power transmitter according to various embodiments.

Figure 25A:
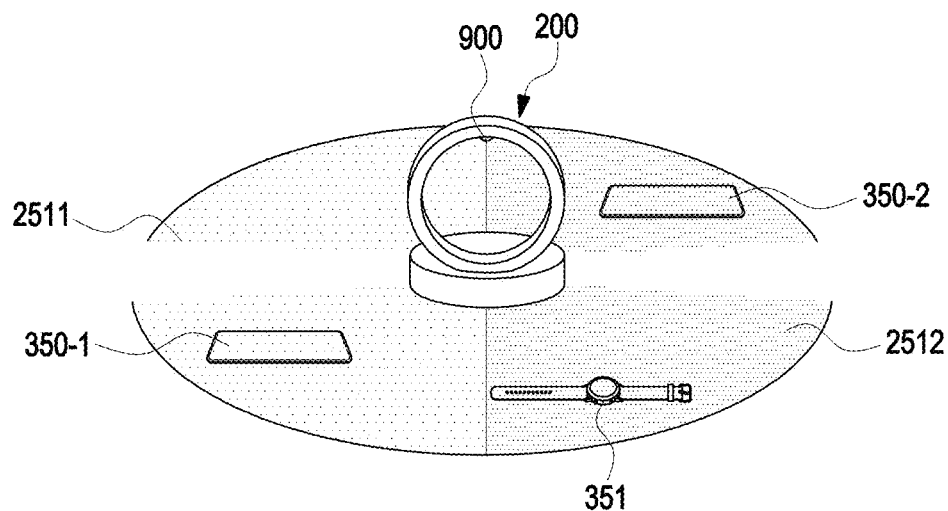
FIG. 25A is a diagram illustrating an example of displaying charging information by a wireless power transmitter according to various embodiments.

Referring to FIG. 25A, when the light emitting device 900 disposed in the wireless power transmitter 200 is a device that emits visible light (e.g., an LED or a beam projector), the charging statuses of a plurality of electronic devices 350-1, 350-2, and 351 may be displayed in different colors. For example, when the light emitting device 900 is an LED as illustrated in FIG. 25A, a first area 2511 of the wirelessly chargeable area may be displayed in blue, and a second area 2512 of the wirelessly chargeable area may be displayed in red.

Figure 25B:
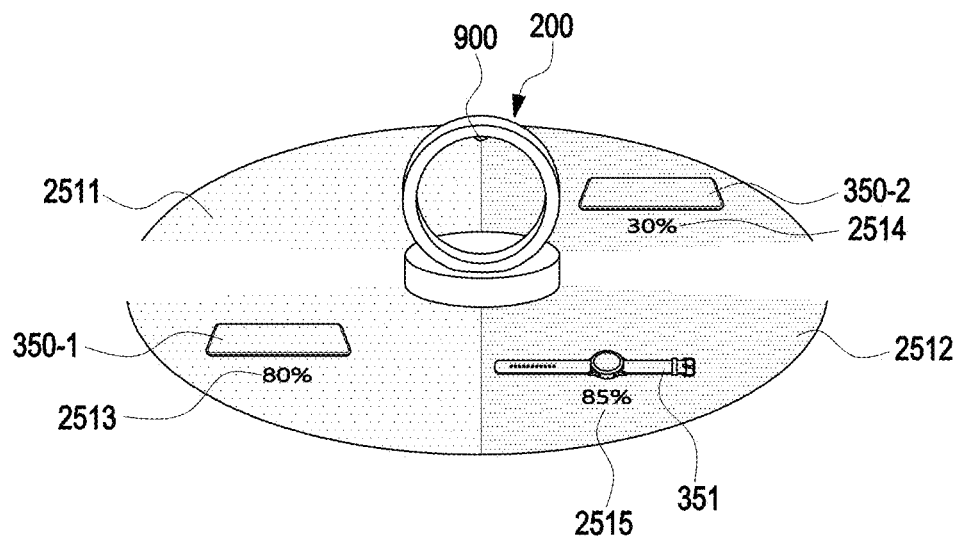
FIG. 25B is a diagram illustrating an example of displaying charging information by a wireless power transmitter according to various embodiments.

Referring to FIG. 25B, when the light emitting device 900 is a beam projector, charging information (e.g., charging status information) for each electronic device 350-1, 350-2, and 351 being charged may be displayed using text or an image. For example, '80%,' which is the charging status information, may be displayed adjacent to a 1-1st electronic device 350-1, '30%,' which is the charging status information, may be displayed adjacent to a 1-2nd electronic device 350-2, and '85%,' which is the charging status information, may be displayed adjacent to a second electronic device 351.

Figure 25C:
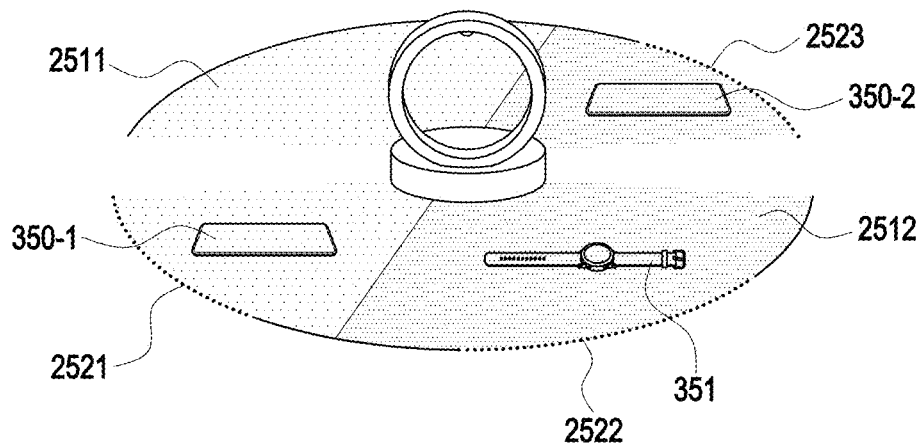
FIG. 25C is a diagram illustrating an example of displaying charging information by a wireless power transmitter according to various embodiments.

Referring to FIG. 25C, when the light emitting device 900 is an LD, an LED, or a beam projector, charging status information may be displayed using graphics, such as dots, on the edges 2521, 2522, and 2523 of the wirelessly chargeable area. For example, for each electronic device 350-1, 350-2, or 351 being charged, charging information (e.g., charging status information) may be displayed using graphics, e.g., dots, on a corresponding edge 2521, 2522, or 2523 of the wirelessly chargeable area.

Figure 25D:
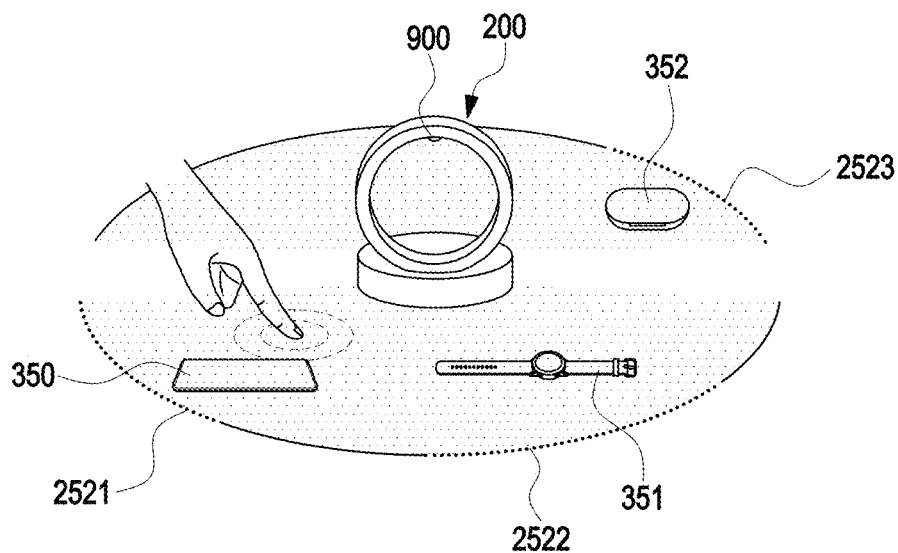
FIG. 25D is a diagram illustrating an example of displaying charging information by a wireless power transmitter according to various embodiments.

Referring to FIG. 25D, when a preset user gesture is taken within the wirelessly chargeable area displayed on the plane, the wireless power transmitter 200 may recognize the user gesture and perform a corresponding function. For example, when the user touches the floor in an area adjacent to the first electronic device 350, the wireless power transmitter 200 may recognize the gesture of touching the floor as a gesture corresponding to a priority setting. By recognizing the gesture corresponding to the priority setting, the wireless power transmitter 200 may control to first charge the electronic device (e.g., the first electronic device 350) closest to the position where the gesture is identified. According to various embodiments, when the user touches the floor in an area adjacent to the first electronic device 350, the wireless power transmitter 200 may control the light emitting device 900 to display an image (e.g., a wave image) corresponding to the touch in the position where the floor is touched.

Figure 26A:
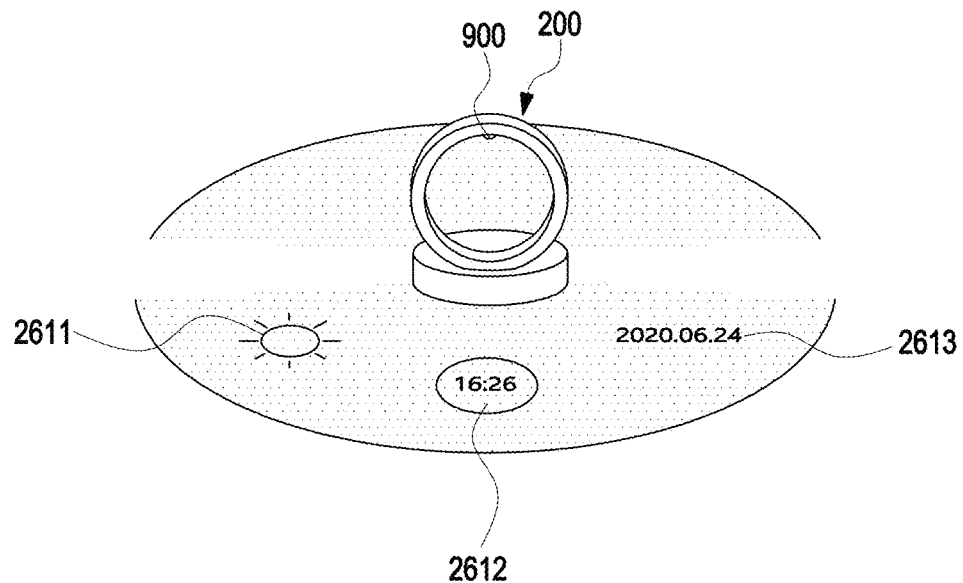
FIG. 26A is a diagram illustrating an example of displaying charging information by a wireless power transmitter according to various embodiments.
Figure 26B:
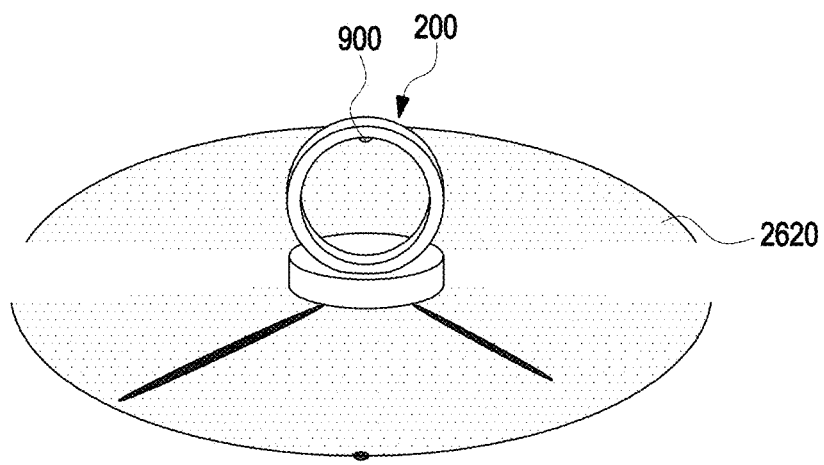
FIG. 26B is a diagram illustrating an example of displaying charging information by a wireless power transmitter according to various embodiments.
Figure 27:
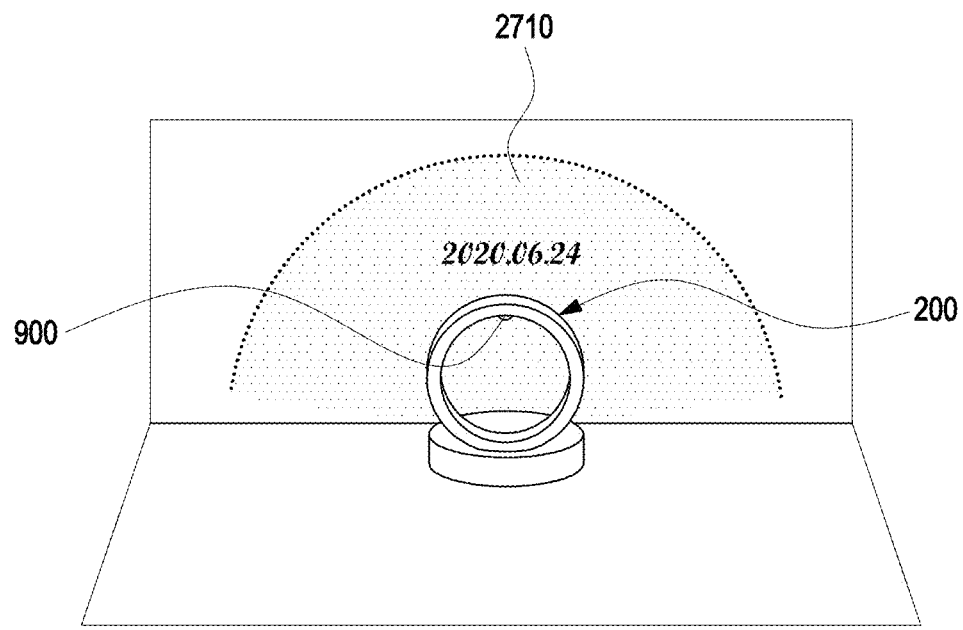
FIG. 27 is a diagram illustrating an example of displaying charging information by a wireless power transmitter according to various embodiments.

FIGS. 26A, 26B, and 27 are diagrams illustrating examples of displaying charging information by a wireless power transmitter according to various embodiments. According to various embodiments, referring to FIG. 26A, when the light emitting device 900 is a beam projector, if there is no electronic device being charged by the wireless power transmitter 200, such information as weather 2611, time 2612, and date 2613, may be displayed in the wirelessly chargeable area as illustrated. According to various embodiments, referring to FIG. 26B, when the light emitting device 900 is an LD, if there is no electronic device being charged by the wireless power transmitter 200, an analog watch 2620 may be displayed using the wirelessly chargeable area as illustrated. According to various embodiments, referring to FIG. 27, when the light emitting device 900 is an LED, if there is no electronic device being charged by the wireless power transmitter 200, the angle of the light emitting device 900 is changed so that an image 2710 including the date may be displayed on the wall as illustrated.

Figure 28:
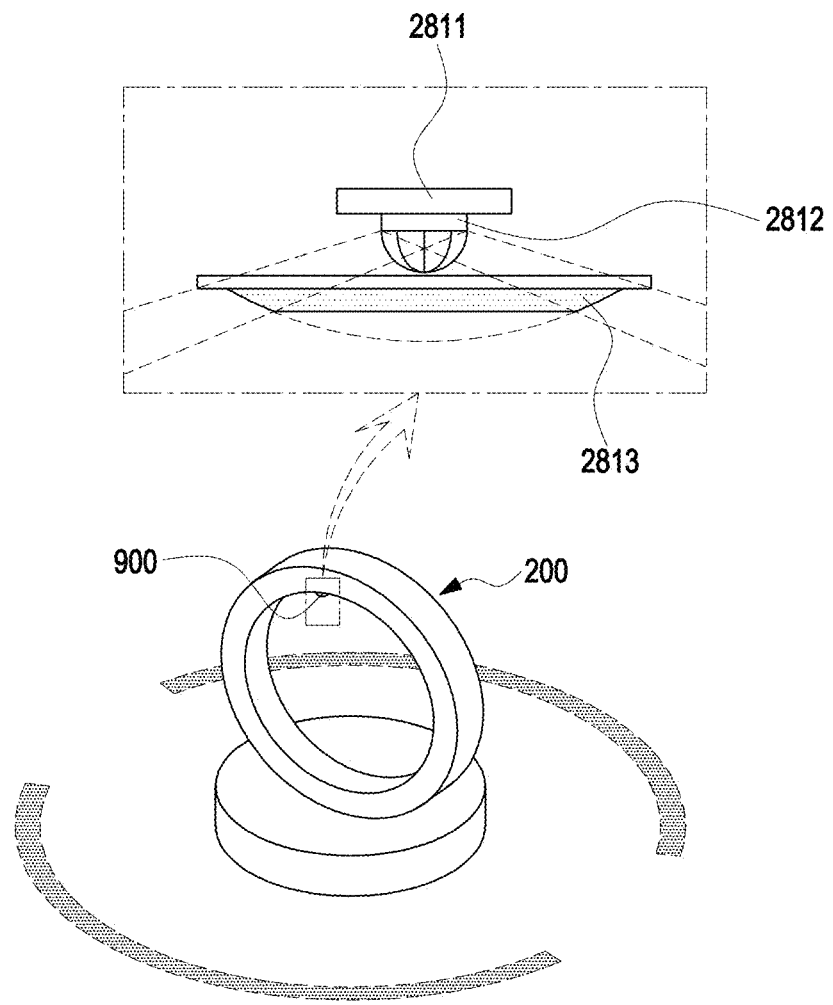
FIG. 28 is a diagram illustrating an example of displaying a chargeable area by a wireless power transmitter according to various embodiments.

FIG. 28 is a diagram illustrating an example of displaying a chargeable area by a wireless power transmitter according to various embodiments.

Referring to FIG. 28, the light emitting device 900 may include an LED 2812, and a printed circuit board (PCB) 2811 for controlling the LED 2812 may be disposed on the LED 2812. A lens 2813 may be disposed apart by a predetermined distance under the LED 2812. The output light of the LED 2812 may be controlled through the PCB 2811, and the light output through the LED 2812 may be spread out to a predetermined area while passing through the lens 2813. Accordingly, the output light passing through the lens 2813 may be displayed, as a wirelessly chargeable area, on a plane. According to various embodiments, the size of the wirelessly chargeable area may be adjusted by adjusting the distance between the LED 2812 and the lens 2813 and/or the radius of curvature of the lens 2813. According to various embodiments, a lower center of the lens 2813 may be painted in black and treated with a thin metal film for light shielding.

Figure 29:
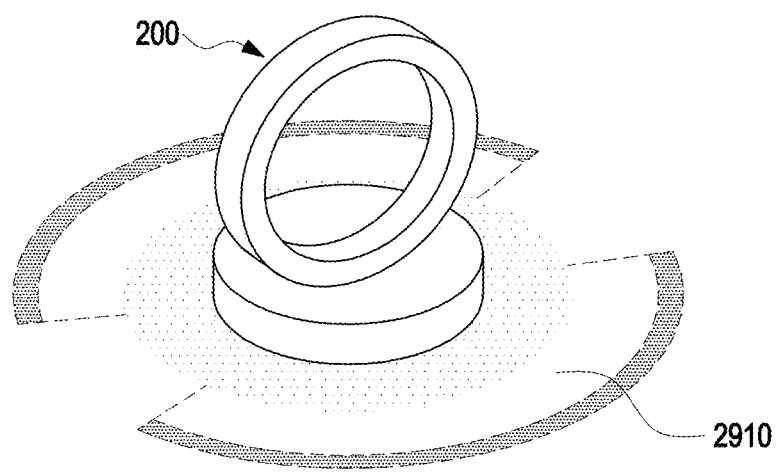
FIG. 29 is a diagram illustrating an example of displaying a chargeable area by a wireless power transmitter according to various embodiments.
Figure 30:
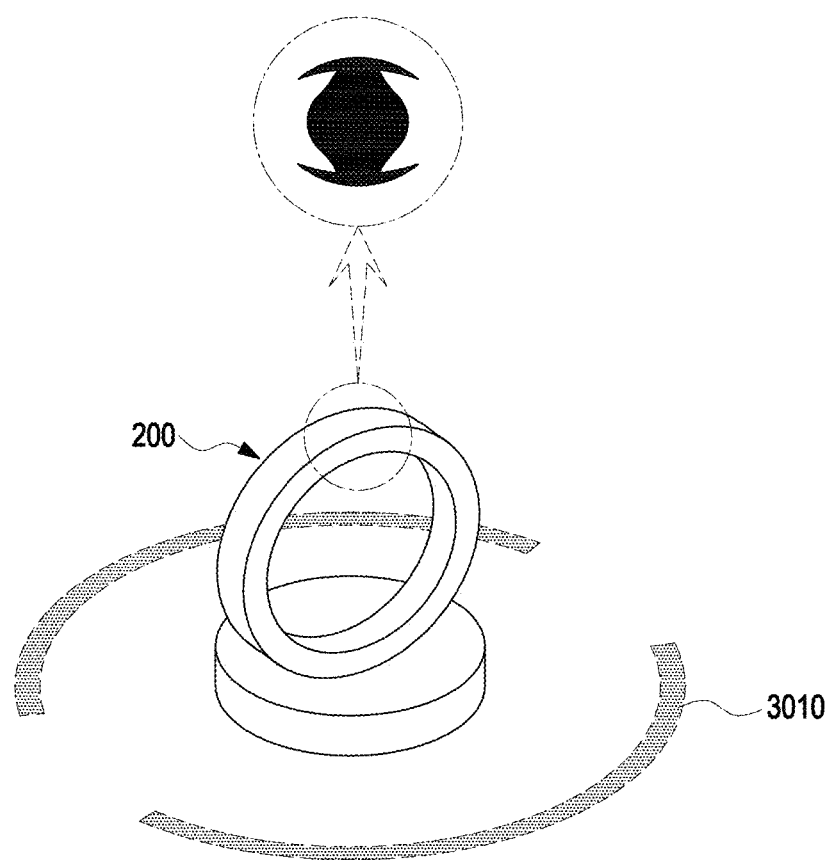
FIG. 30 is a diagram illustrating an example of displaying a chargeable area by a wireless power transmitter according to various embodiments.
Figure 31:
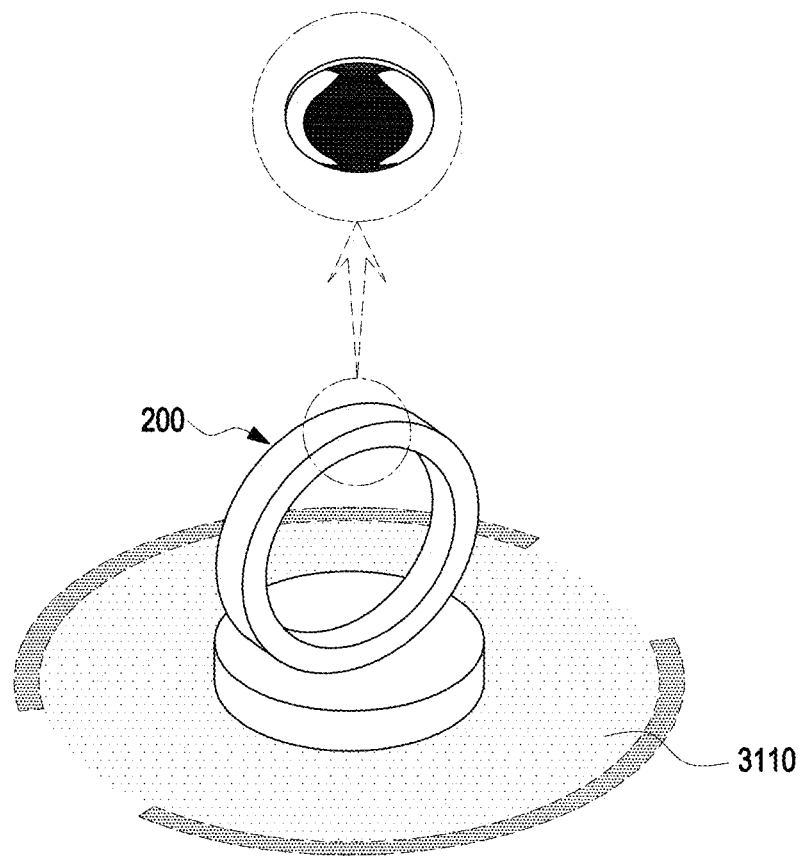
FIG. 31 is a diagram illustrating an example of displaying a chargeable area by a wireless power transmitter according to various embodiments.

FIGS. 29, 30, and 31 are diagrams illustrating examples of displaying a chargeable area by a wireless power transmitter according to various embodiments. FIG. 29 illustrates a wirelessly chargeable area 2910 displayed on a plane when the light emitting device 900 is not masked. FIG. 30 illustrates a wirelessly chargeable area 3010 displayed on a plane when the back surface of the light emitting device 900 is masked. FIG. 31 illustrates a wirelessly chargeable area 3110 displayed on a plane when the front surface of the light emitting device 900 is masked. According to various embodiments, it is possible to prevent and/or reduce glare on the wireless power transmitter 200 or shadow from the wireless power transmitter 200 by masking the front or back surface of the light emitting device 900.

Figure 32:
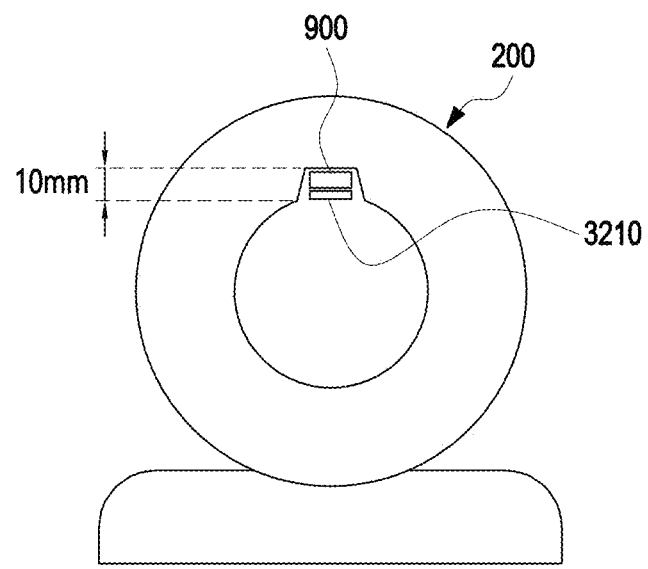
FIG. 32 is a diagram illustrating a light emitting device of a wireless power transmitter according to various embodiments.
Figure 33:
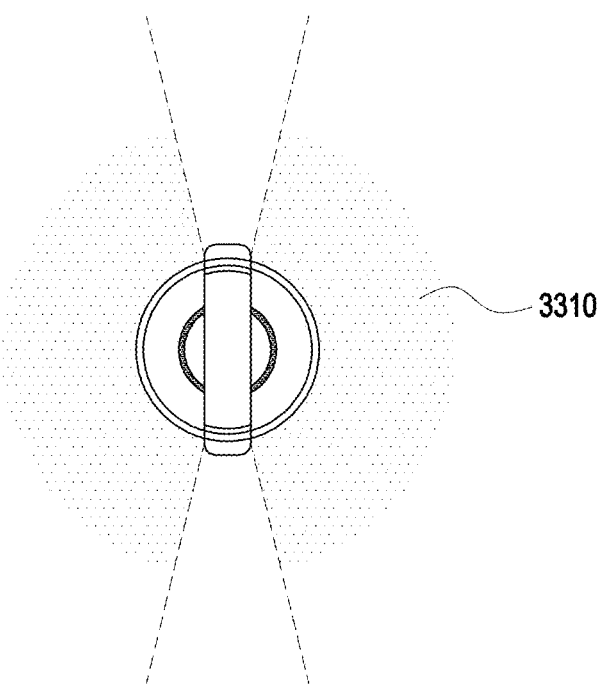
FIG. 33 is a diagram illustrating an example of displaying a chargeable area by a wireless power transmitter according to various embodiments.

FIG. 32 is a diagram illustrating an example light emitting device of a wireless power transmitter according to various embodiments. Referring to FIG. 32, a wireless power transmitter 200 may have at least one light emitting device 900 (e.g., the light emitting device 242 of FIG. 3) inside an upper portion of the second resonator housing 241. According to various embodiments, the at least one light emitting device 900 may include at least one of an LD, an LED, or a beam projector. A lens 3210 may be disposed apart by a predetermined distance under the light emitting device 900. As the light emitting device 900 is disposed on the upper inner side of the second resonator housing 241 as illustrated in FIG. 32, a wirelessly chargeable area 3310 as illustrated in FIG. 33 may be displayed as viewed from above the wireless power transmitter 200.

Figure 34:
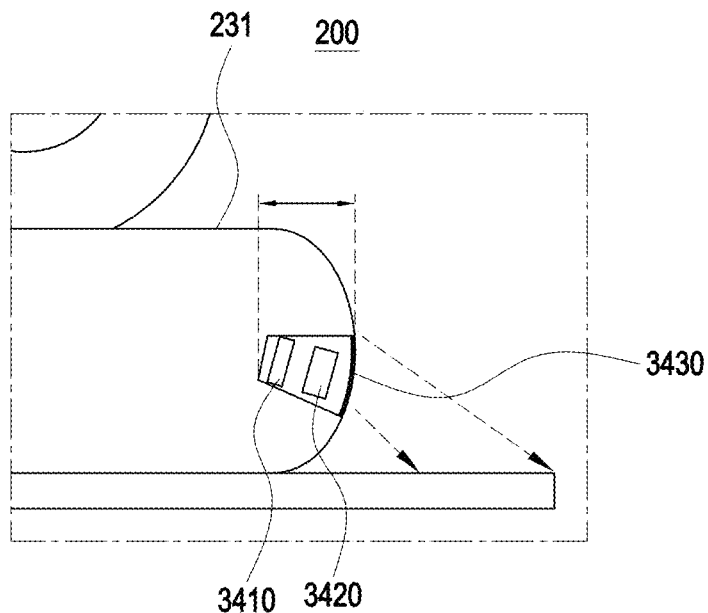
FIG. 34 is a diagram illustrating a light emitting device of a wireless power transmitter according to various embodiments.
Figure 35:
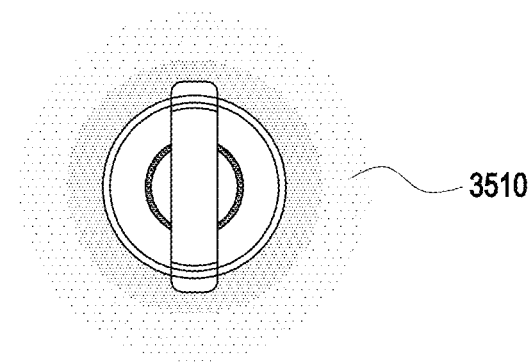
FIG. 35 is a diagram illustrating an example of displaying a chargeable area by a wireless power transmitter according to various embodiments.

FIG. 34 is a diagram illustrating an example light emitting device of a wireless power transmitter according to various embodiments. Referring to FIG. 34, at least one light emitting device 3410, at least one light guide 3420, and at least one lens 3430 may be disposed at the periphery of the first resonator housing 231. For example, a plurality of light emitting devices 3410 and a plurality of light guides 3420 and a plurality of lenses 3430 corresponding thereto may be disposed at the periphery of the first resonator housing 231. According to various embodiments, when the light emitting devices 3410 are disposed at the periphery of the first resonator housing 231 as illustrated in FIG. 34, the wirelessly chargeable area 3510 may be displayed in the form illustrated in FIG. 35.

Figure 36:
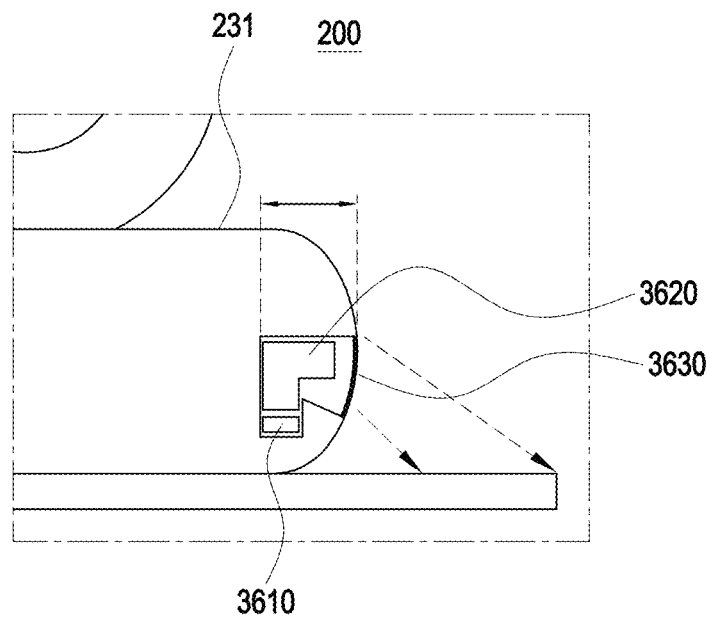
FIG. 36 is a diagram illustrating a light emitting device of a wireless power transmitter according to various embodiments.
Figure 37:
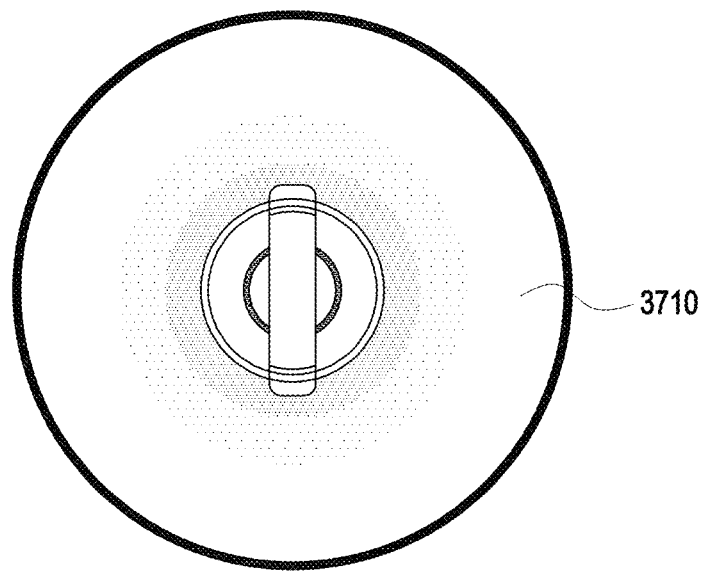
FIG. 37 is a diagram illustrating an example of displaying a chargeable area by a wireless power transmitter according to various embodiments.

FIG. 36 is a diagram illustrating an example light emitting device of a wireless power transmitter according to various embodiments. Referring to FIG. 36, at least one light emitting device 3640, at least one light guide 3620, and at least one lens 330 may be disposed at the periphery of the first resonator housing 231. The light guide 3620 may be disposed in the "L" shape as illustrated, refracting the light output from the light emitting device 3610 towards the lens 3630. For example, a plurality of light emitting devices 3610 and a plurality of light guides 3620 and a plurality of lenses 3630 corresponding thereto may be disposed at the periphery of the first resonator housing 231. According to various embodiments, when the light emitting devices 3610 are disposed at the periphery of the first resonator housing 231 as illustrated in FIG. 36, the wirelessly chargeable area 3710 may be displayed in the form illustrated in FIG. 37.

Figure 38:
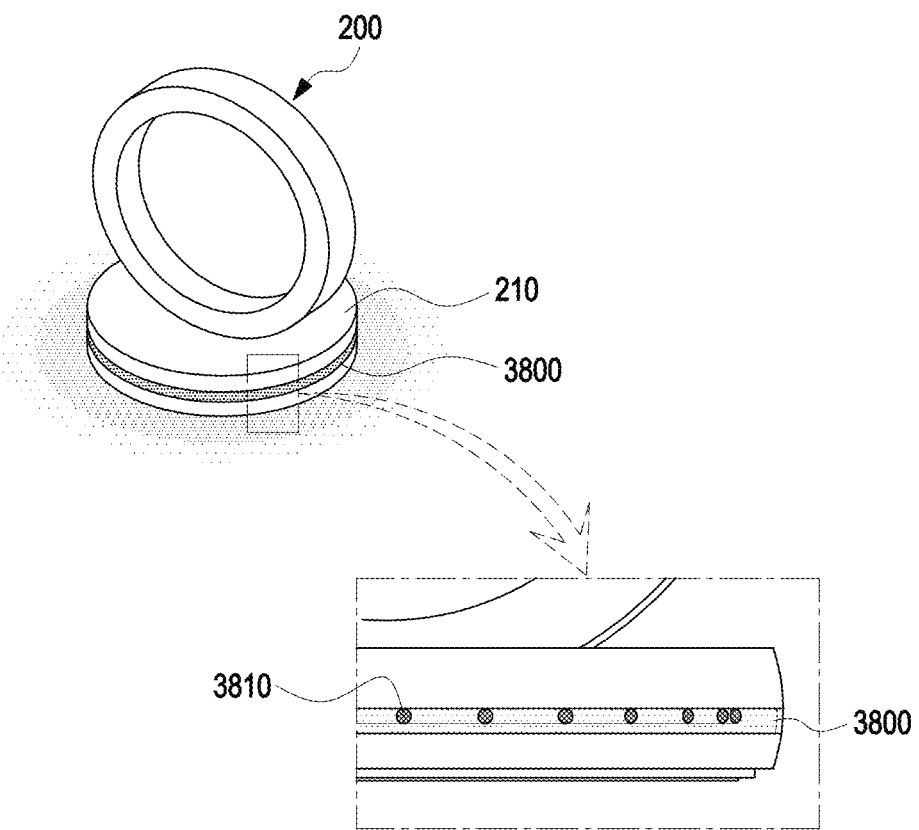
FIG. 38 is a diagram illustrating a light emitting device of a wireless power transmitter according to various embodiments.

FIG. 38 is a diagram illustrating an example light emitting device of a wireless power transmitter according to various embodiments. Referring to FIG. 38, a plurality of (e.g., 24) the light emitting devices 3810 (e.g., 3410 and 3610 as illustrated in FIGS. 34 and 36) may be disposed at the periphery of the first resonator housing 3800 (e.g., the first resonator housing 231).

Figure 39:
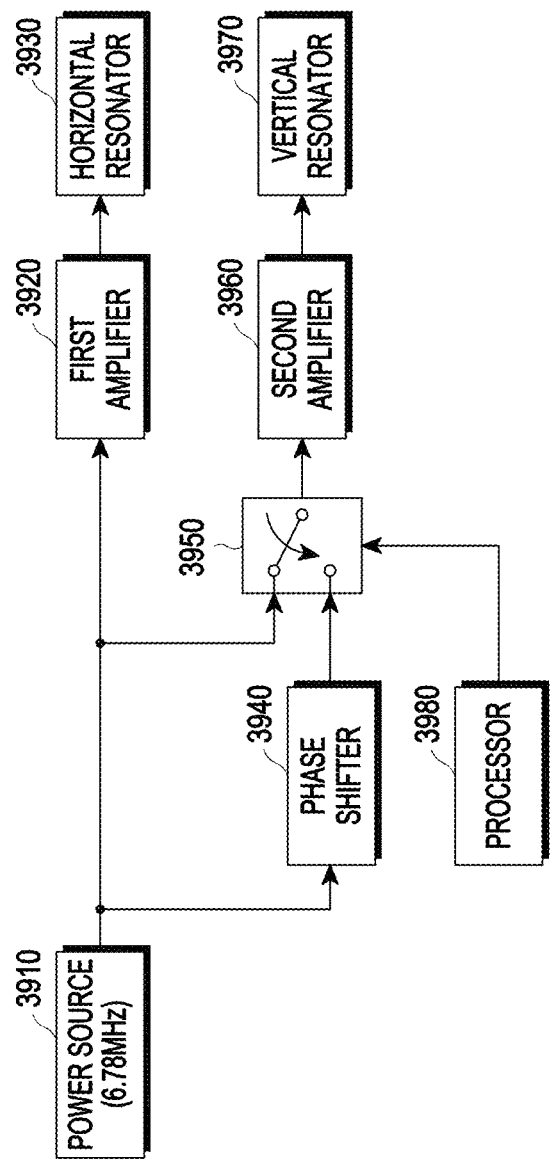
FIG. 39 is a block diagram illustrating an example configuration of a wireless power transmitter according to various embodiments.

FIG. 39 is a block diagram illustrating an example configuration of a wireless power transmitter according to various embodiments. Referring to FIG. 39, a wireless power transmitter may include a power source 3910, a first amplifier 3920, a horizontal resonator 3930 (e.g., the first resonator 230 of FIG. 3), a phase shifter (e.g., including phase shifting circuitry) 3940, a switch 3950, a second amplifier 3960, a vertical resonator 3970 (e.g., the second resonator 240 of FIG. 3), and a processor (e.g., including processing circuitry) 3980 (e.g., the processor 102 of FIG. 2A).

Power (e.g., power of a resonant frequency of 6.78 MHz) supplied from the power source 3910 may be amplified through the first amplifier 3920, then transmitted to the horizontal resonator 3930, and amplified through the second amplifier 3960, then transmitted to the vertical resonator 3970.

According to various embodiments, the processor 3980 may control the switch 3950 so that the power supplied from the power source 3910 to the vertical resonator 3970 through the second amplifier 3960 is phase-shifted through the phase shifter 3940. For example, when the processor 3980 controls the switch 3950 so that the power supplied from the power source 3910 to the vertical resonator 3970 through the second amplifier 3960 is phase-shifted by 90 degrees through the phase shifter 3940, the output power of the horizontal resonator 3930 and the output power of the vertical resonator 3970 have a phase difference of 90 degrees. When the output power of the horizontal resonator 3930 and the output power of the vertical resonator 3970 have a phase difference of 90 degrees, a uniform magnetic field distribution is formed in 3D space, forming a 360-degree charging area. For example, when a chargeable area corresponding to 360 degrees is set, the wireless power transmitter 200 may control the switch 3950 to supply 90-degree phase-shifted power to the vertical resonator 3970 so that wireless power may be output to the 360-degree charging area.

According to various embodiments, when the processor 3980 controls the switch 3950 so that the power supplied from the power source 3910 to the vertical resonator 3970 through the second amplifier 3960 is supplied without passing through the phase shifter 3940, the output power of the horizontal resonator 3930 and the output power of the vertical resonator 3970 have the same phase. When the output power of the horizontal resonator 3930 and the output power of the vertical resonator 3970 have the same phase, the magnetic fields are merged on the front of the wireless power transmitter 200 to increase the efficiency, but the magnetic field is weakened at the back to reduce efficiency. Thus, a 180-degree charging area around the wireless power transmitter 200 may be formed. For example, when a chargeable area corresponding to 180 degrees is set, the wireless power transmitter 200 may control the switch 3950 to supply power having the same phase as the horizontal resonator 3930 to the vertical resonator 3970 so that wireless power may be output to the 180-degree charging area.

Figure 40:
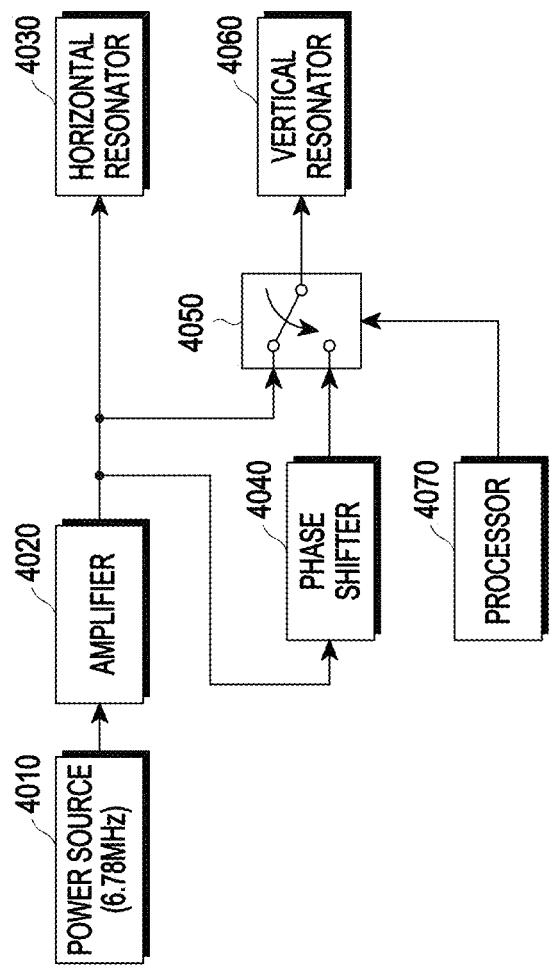
FIG. 40 is a block diagram illustrating an example configuration of a wireless power transmitter according to various embodiments.

FIG. 40 is a block diagram illustrating an example configuration of a wireless power transmitter according to various embodiments. Referring to FIG. 40, a wireless power transmitter may include a power source 4010, an amplifier 4020, a horizontal resonator 4030 (e.g., the first resonator 230 of FIG. 3), a phase shifter (e.g., including phase shifting circuitry) 4040, a switch 4050, a vertical resonator 4060 (e.g., the second resonator 240 of FIG. 3), and a processor (e.g., including processing circuitry) 4070 (e.g., the processor 102 of FIG. 2A).

Power (e.g., power of a resonant frequency of 6.78 MHz) supplied from the power source 4010 may be amplified through the amplifier 4020, then transmitted to the horizontal resonator 4030 and the vertical resonator 4060.

According to various embodiments, the processor 4070 may control the switch 4050 so that the power supplied from the power source 4010 to the vertical resonator 4060 through the amplifier 4020 is phase-shifted through the phase shifter 4040. For example, when the processor 4070 controls the switch 4050 so that the power supplied from the power source 4010 to the vertical resonator 4060 through the amplifier 4020 is phase-shifted by 90 degrees through the phase shifter 4040, the output power of the horizontal resonator 4030 and the output power of the vertical resonator 4060 have a phase difference of 90 degrees. When the output power of the horizontal resonator 4030 and the output power of the vertical resonator 4060 have a phase difference of 90 degrees, a uniform magnetic field distribution is formed in 3D space, forming a 360-degree charging area. For example, when a chargeable area corresponding to 360 degrees is set, the wireless power transmitter 200 may control the switch 4050 to supply 90-degree phase-shifted power to the vertical resonator 4060 so that wireless power may be output to the 360-degree charging area.

According to various embodiments, when the processor 4070 controls the switch 4050 so that the power supplied from the power source 4010 to the vertical resonator 4060 through the amplifier 4020 is supplied without passing through the phase shifter 4040, the output power of the horizontal resonator 4030 and the output power of the vertical resonator 4060 have the same phase. When the output power of the horizontal resonator 4030 and the output power of the vertical resonator 4060 have the same phase, the magnetic fields are merged on the front of the wireless power transmitter 200 to increase the efficiency, but the magnetic field is weakened at the back to reduce efficiency. Thus, a 180-degree charging area around the wireless power transmitter 200 may be formed. For example, when a chargeable area corresponding to 180 degrees is set, the wireless power transmitter 200 may control the switch 4050 to supply power having the same phase as the horizontal resonator 4030 to the vertical resonator 4060 so that wireless power may be output to the 180-degree charging area.

According to an example embodiment, an electronic device may comprise: a first resonator including at least one coil, a second resonator including at least one coil, at least one light emitting device including light emitting circuitry, at least one phase shifter including phase shifting circuitry, and a processor. The processor may be configured to: control the electronic device receive a signal for changing a wirelessly chargeable area, control the at least one light emitting device to display a second wirelessly chargeable area changed from a first wirelessly chargeable area of the electronic device on a plane where the electronic device is placed in response to receiving the signal for changing the wirelessly chargeable area, and control the at least one phase shifter to supply phase-shifted power to the first resonator or the second resonator to output wireless power in a direction corresponding to the second wirelessly chargeable area.

According to various example embodiments, based on an angle of the wirelessly chargeable area around the wireless power transmitter being decreased as the wirelessly chargeable area is changed, a radius of the wirelessly chargeable area may be increased.

According to various example embodiments, the at least one light emitting device may include at least one of a laser diode (LD), a light-emitting diode (LED), or a beam projector.

According to various example embodiments, the first resonator may be disposed in parallel to a ground, and the second resonator may be disposed perpendicular to the first resonator.

According to various example embodiments, the processor may be configured to control the at least one light emitting device to display charging-related information in the wirelessly chargeable area displayed on the plane.

According to various example embodiments, the charging-related information may be displayed using at least one of text, an image, or a color.

According to various example embodiments, the charging-related information may be displayed in a portion of the wirelessly chargeable area corresponding to information for each target for charging, on a boundary line of the wirelessly chargeable area.

According to various example embodiments, the processor may be configured to control the electronic device to further display information for guiding a charging position of an external electronic device in the wirelessly chargeable area displayed on the plane based on the external electronic device to be charged entering the wirelessly chargeable area.

According to various example embodiments, the processor may be configured to control the light emitting device to display the wirelessly chargeable area on the plane based on an external electronic device entering within a specified distance from the electronic device.

According to various example embodiments, the processor may be configured to first charge an external electronic device positioned closest to a preset gesture based on the preset gesture being recognized in the wirelessly chargeable area displayed on the plane.

According to an example embodiment, a method for operating an electronic device may comprise: receiving a signal for changing a wirelessly chargeable area, controlling at least one light emitting device to display a second wirelessly chargeable area changed from a first wirelessly chargeable area of the electronic device on a plane where the electronic device is placed in response to receiving the signal for changing the wirelessly chargeable area, and supplying phase-shifted power to a first resonator or a second resonator included in the electronic device to output wireless power in a direction corresponding to the second wirelessly chargeable area.

According to various example embodiments, based on an angle of the wirelessly chargeable area around the wireless power transmitter being decreased as the wirelessly chargeable area is changed, a radius of the wirelessly chargeable area may be increased.

According to various example embodiments, the at least one light emitting device may include at least one of an LD, an LED, or a beam projector.

According to various example embodiments, the method may further comprise identifying a position of a first electronic device based on the first electronic device being recognized as a target device for charging; controlling the at least one light emitting device to display a first area corresponding to the position of the first electronic device, as a wirelessly chargeable area, on a plane where the electronic device is placed, identifying a position of a second electronic device based on the second electronic device being recognized as an additional target device for charging, and controlling the at least one light emitting device to display a second area corresponding to positions of the first electronic device and the second electronic device, as a wirelessly chargeable area, on the plane where the electronic device is placed.

According to various example embodiments, the method may further comprise controlling the at least one light emitting device to display charging-related information in the wirelessly chargeable area displayed on the plane.

According to various example embodiments, the charging-related information may be displayed using at least one of text, an image, or a color.

According to various example embodiments, the charging-related information may be displayed in a portion corresponding to information for each target for charging, on a boundary line of the wirelessly chargeable area.

According to various example embodiments, the method may further comprise controlling the electronic device to further display information for guiding a charging position of an external electronic device in the wirelessly chargeable area displayed on the plane based on the external electronic device to be charged entering the wirelessly chargeable area.

According to various example embodiments, the method may further comprise controlling the light emitting device to display the wirelessly chargeable area on the plane based on an external electronic device entering within a specified distance from the electronic device.

According to various example embodiments, the method may further comprise first charging an external electronic device positioned closest to a preset gesture based on the preset gesture being recognized in the wirelessly chargeable area displayed on the plane.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents.

What is claimed is:

1. A wireless power transmitter, comprising:
a first resonator including at least one coil;
a second resonator including at least one coil;
at least one light emitting device comprising light-emitting circuitry; at
least one phase shifter comprising phase shifting circuitry;
memory storing instructions; and
at least one processor,
wherein the instructions, when executed by the at least one processor, cause the wireless power transmitter to:
control the at least one light emitting device to display a first wirelessly chargeable area on a plane where an electronic device is placed;
control the wireless power transmitter to receive a signal for changing the first wirelessly chargeable area on the plane where the electronic device is placed; and
in response to receiving the signal for changing the first wirelessly chargeable area, control the at least one light emitting device to display a second wirelessly chargeable area changed from the first wirelessly chargeable area, on the plane where the electronic device is placed, wherein the at least one phase shifter supplies phase-shifted power to the first resonator or the second resonator to output wireless power in a direction corresponding to the second wirelessly chargeable area,
wherein as the at least one light emitting device moves downward in an orthogonal direction to the plane where the electronic device is placed, the first wirelessly chargeable area boundaries are changed such that an arc length of the first wireless chargeable area decreases as the radius from the central axis of the wireless power transmitter to the arc length of the first wirelessly chargeable area increases.

2. The wireless power transmitter of claim 1, wherein the at least one light emitting device includes at least one of a laser diode (LD), a light emitting diode (LED), or a beam projector.

3. The wireless power transmitter of claim 1, wherein the first resonator is disposed in parallel to a ground, and the second resonator is disposed perpendicular to the first resonator.

4. The wireless power transmitter of claim 1, wherein the instructions, when executed by the at least one processor, further cause the wireless power transmitter to control the at least one light emitting device to display charging-related information in the first wirelessly chargeable area displayed on the plane.

5. The wireless power transmitter of claim 4, wherein the charging-related information is displayed using at least one of text, an image, or a color.

6. The wireless power transmitter of claim 4, wherein the charging-related information is displayed in a portion of the first wirelessly chargeable area corresponding to information for each target for charging, on a boundary line of the first wirelessly chargeable area.

7. The wireless power transmitter of claim 1, wherein the instructions, when executed by the at least one processor, further cause the wireless power transmitter to further display information for guiding a charging position of the electronic device in the first wirelessly chargeable area displayed on the plane based on the electronic device to be charged entering the first wirelessly chargeable area.

8. The wireless power transmitter of claim 1, wherein the instructions, when executed by the at least one processor, further cause the wireless power transmitter to control the light emitting device to display the first wirelessly chargeable area on the plane based on the electronic device entering within a specified distance from the wireless power transmitter.

9. A method for operating an wireless power transmitter, the method comprising:
controlling at least one light emitting device to display a first wirelessly chargeable area on a plane where an electronic device is placed;
receiving a signal for changing the first wirelessly chargeable area on the plane where the electronic device is placed; and
in response to receiving the signal for changing the first wirelessly chargeable area, controlling the at least one light emitting device to display a second wirelessly chargeable area changed from the first wirelessly chargeable area, on the plane where the electronic device is placed,
wherein the wireless power transmitter supplies phase-shifted power to a first resonator or a second resonator included in the wireless power transmitter to output wireless power in a direction corresponding to the second wirelessly chargeable area, wherein as the at least one light emitting device moves downward in an orthogonal direction to the plane where the electronic device is placed, the first wirelessly chargeable area boundaries are changed such that an arc length of the first wireless chargeable area decreases as the radius from the central axis of the wireless power transmitter to the arc length of the first wirelessly chargeable area increases.

10. The method of claim 9, wherein the at least one light emitting device includes at least one of a laser diode (LD), a light emitting diode (LED), or a beam projector.

11. The method of claim 9, further comprising:
identifying a position of a first electronic device based on the first electronic device being recognized as a target device for charging;
controlling the at least one light emitting device to display a first area corresponding to the position of the first electronic device, as a wirelessly chargeable area, on a plane where the electronic device is placed;
identifying a position of a second electronic device based on the second electronic device being recognized as an additional target device for charging; and
controlling the at least one light emitting device to display a second area corresponding to the positions of the first electronic device and the second electronic device, as a wirelessly chargeable area, on a plane where the electronic device is placed.

12. The method of claim 9, further comprising controlling the at least one light emitting device to display charging-related information in the first wirelessly chargeable area displayed on the plane.

13. The method of claim 12, wherein the charging-related information is displayed using at least one of text, an image, or a color.

14. The method of claim 12, wherein the charging-related information is displayed in a portion of the first wirelessly chargeable area corresponding to information for each target for charging, on a boundary line of the first wirelessly chargeable area.

15. The method of claim 9, further comprising controlling the wireless power transmitter to display information for guiding a charging position of the electronic device in the first wirelessly chargeable area displayed on the plane based on the electronic device to be charged entering the first wirelessly chargeable area.

16. The method of claim 9, further comprising controlling the light emitting device to display the first wirelessly chargeable area on the plane based on the electronic device entering within a specified distance from the wireless power transmitter.

17. A non-transitory computer readable medium having instructions stored therein, which when executed by at least one processor cause the at least one processor to execute a method of controlling wireless power transmitter, the method comprising:
controlling at least one light emitting device to display a first wirelessly chargeable area on a plane where an electronic device is placed;
receiving a signal for changing the first wirelessly chargeable area on the plane where the electronic device is placed; and
in response to receiving the signal for changing the first wirelessly chargeable area, controlling the at least one light emitting device to display a second wirelessly chargeable area changed from the first wirelessly chargeable area, on the plane where the electronic device is placed;
wherein the wireless power transmitter supplies phase-shifted power to a first resonator or a second resonator included in the wireless power transmitter to output wireless power in a direction corresponding to the second wirelessly chargeable area,
wherein as the at least one light emitting device moves downward in an orthogonal direction to the plane where the electronic device is placed, the first wirelessly chargeable area boundaries are changed such that an arc length of the first wireless chargeable area decreases as the radius from the central axis of the wireless power transmitter to the arc length of the first wirelessly chargeable area increases.

* * * * *